United States Patent
Carter et al.

(10) Patent No.: US 7,796,675 B1
(45) Date of Patent: Sep. 14, 2010

(54) BURST SPREAD SPECTRUM RADIO SYSTEM AND METHOD FOR SITE MONITORING

(75) Inventors: David Carter, Draper, UT (US); Sy Prestwich, Riverton, UT (US); James R. Baker, Leesburg, VA (US); Scott Bevan, Lehi, UT (US)

(73) Assignee: Recon Dynamics, LLC, Kirkland, WA (US)

( * ) Notice: Subject to any disclaimer, the term of this patent is extended or adjusted under 35 U.S.C. 154(b) by 367 days.

(21) Appl. No.: 12/046,950

(22) Filed: Mar. 12, 2008

(51) Int. Cl.
*H04B 1/00* (2006.01)
(52) U.S. Cl. .................. 375/130; 375/146; 375/147; 375/219
(58) Field of Classification Search ............ 375/130, 375/146, 147, 219, 295
See application file for complete search history.

(56) References Cited

U.S. PATENT DOCUMENTS

| | | | |
|---|---|---|---|
| 6,496,111 B1 | 12/2002 | Hosack | |
| 6,608,557 B1 | 8/2003 | Menard et al. | |
| 6,674,367 B2 | 1/2004 | Sweatte | |
| 6,693,530 B1 | 2/2004 | Dowens et al. | |
| 6,759,956 B2 | 7/2004 | Menard et al. | |
| 6,771,173 B1 | 8/2004 | Clayton et al. | |
| 6,847,293 B2 | 1/2005 | Menard et al. | |
| 6,859,485 B2 * | 2/2005 | Belcher | 375/130 |
| 6,873,261 B2 | 3/2005 | Anthony et al. | |
| 6,930,599 B2 | 8/2005 | Naidoo et al. | |
| 6,930,604 B2 | 8/2005 | Marino | |
| 6,943,682 B1 | 9/2005 | Dowens et al. | |
| 7,129,848 B2 * | 10/2006 | Milliot et al. | 340/628 |
| 7,570,748 B2 * | 8/2009 | Ishii et al. | 379/93.01 |
| 7,606,288 B2 * | 10/2009 | Prestwich et al. | 375/130 |
| 2003/0214407 A1 | 11/2003 | Sweatte | |
| 2005/0030179 A1 | 2/2005 | Script et al. | |
| 2005/0088523 A1 | 4/2005 | Wu et al. | |

OTHER PUBLICATIONS

"8-Zone Expandable Hardwired Security System," S:\ALLCLIENTS\3479 S5 Wireless\3479.2.7\PriorArt\8-Zone Expandable Hardwired-Wireless Security System.mht, May 12, 2008.

(Continued)

*Primary Examiner*—Ted M Wang
(74) *Attorney, Agent, or Firm*—Austin Rapp & Hardman

(57) ABSTRACT

A device for site monitoring is disclosed. The device may include a communication interface configured to receive site monitoring data from a site monitoring system. The communication interface may also be configured to wirelessly transmit the site monitoring data to a base station. The site monitoring data may include a device identification. The device also may include a processor and memory. The memory also may include two pseudonoise (PN) codes, namely a first PN code and a second PN code. The site monitoring data may be received from the site monitoring system. The site monitoring data may be spread using the first PN code to provide first spread site monitoring data. The first spread site monitoring data may be spread using the second PN code to provide second spread site monitoring data. The second spread site monitoring data may be transmitted using a burst direct sequence spread spectrum radio signal.

20 Claims, 18 Drawing Sheets

OTHER PUBLICATIONS

"How It Works: Alarm.com's Advanced Technology," http://www.alarm.com/about/, May 12, 2008.

"GE Security Simon 3 Wireless Security System," http://www.homesecuritystore.com/ezstore123/DTProductZoom.asp?productID=904&bViaAC=False, May 12, 2008.

"Guard Dog Defense Wireless Wide Angle Video Camera for Inside or Outside," http://www.guarddog.net/walarm.htm, May 12, 2008.

"WA400 Accessories—Wireless Burglar Alarm System," http://home-alarm-system.youdoitsecurity.com/WA400.asp, May 12, 2008.

"RSSGSM—Alarms on the GSM Cellular/Mobile Network," http://www.radiosecurity.co.uk/gsm.html, May 12, 2008.

"Skylink, SL Gold Deluxe, Complete Alarm System," http://www.dimango.com/2000.htm#slgolddeluxe, May 12, 2008.

"Visonic PowerMax Wireless Kit," http://www.homesecuritystore.com/detail_pages/powermax.htm, May 12, 2008.

"Wireless Alarm System, LP-1500 Security System," http://www.laipac.com/wire_lp1500_eng.htm, May 12, 2008.

"Ciscor Wireless Security Systems," http://www.ciscor.com/meth/wireless_security_systems.html, May 12, 2008.

"Wireless Sensor/Annunciator System," http://www.hometech.com/security/optex.html, May 12, 2008.

"Wireless Ethernet and RS232 modems ideal for the Security Industry," http://www.data-linc.com/security/index.htm, May 12, 2008.

"X10 Wireless Home Security Cameras," http://www.x10.com/minisites/security_camera/wireless_home_security_camera.html, May 12, 2008.

"X-10 PRO2000 Monitored Security System Value Pack," http://www.smarthome.com/7326.HTML, May 12, 2008.

* cited by examiner

US 7,796,675 B1

BURST SPREAD SPECTRUM RADIO SYSTEM AND METHOD FOR SITE MONITORING

TECHNICAL FIELD

The present invention relates generally to wireless communication systems. More specifically, the present invention relates to systems and methods for site monitoring through the use of a burst spread spectrum radio system and security devices.

BACKGROUND

Many personal, corporate, or government sites are vulnerable to security threats, theft, or vandalism. Security systems that monitor these premises are usually expensive and typically ineffective. Such monitoring security systems are also typically immobile, require human-intervention, and are often slow to respond to trouble.

Modern technologies may be used in site monitoring. Computer and communication technologies utilize electronic devices that may be used to monitor areas or locations. Many of the computer and/or communication devices have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computing devices typically have one or more processors. The processor(s) usually are interconnected to different external inputs and outputs and function to manage the particular computer or device. For example, a processor in a security camera may be connected to buttons used to select the camera settings and/or to a communications port to provide video or pictures from the camera.

Many electronic devices include one or more small computers. For example, security cameras, motion sensors, keypad entry systems, alarm systems, air conditioning systems, refrigerators, telephones, typewriters, automobiles, vending machines, and many different types of industrial equipment now typically have small computers, or processors, inside of them. Computer software runs the processors of these computers and tells the processors what to do to carry out certain tasks. For example, the computer software running on an alarm system may cause an alarm to sound when a particular input is detected or may cause an area to be locked down when certain events occur.

Wireless communication technologies have also advanced to allow remote communication between people and devices. Common examples of wireless communication devices include cellular telephones, pagers, radio transmitters, cordless telephones, etc. As wireless communication technologies continue to advance, it is easier and cheaper to communicate without the need of wired devices.

Benefits may be realized if means were provided to enable site monitoring through the use of modern wireless and computer technologies.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
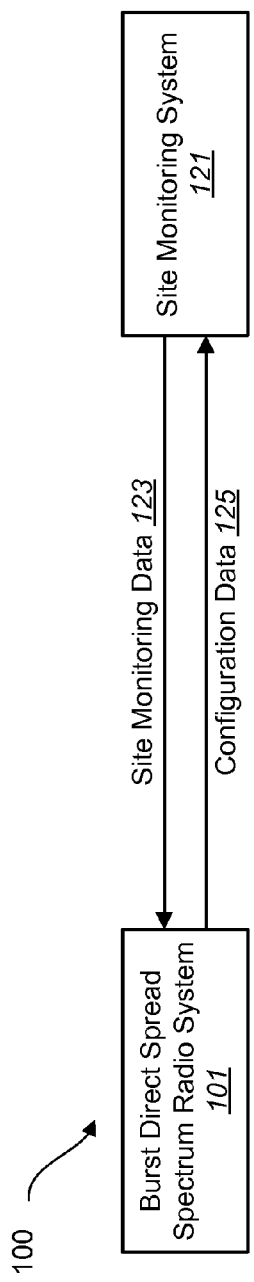
FIG. 1 is a block diagram of an embodiment of a system for site monitoring through the use of burst Direct Sequence Spread Spectrum (DSSS) radio signals.

A device for site monitoring is disclosed. The device includes a communication interface that is configured to receive site monitoring data from a site monitoring system. The communication interface is also configured to wirelessly transmit the site monitoring data to at least one base station. The site monitoring data includes a device identification. The device also includes a processor and memory. The processor is in electronic communication with the communication interface. The memory is in electronic communication with the processor. The memory is configured such that it includes a device identification that identifies the device. The memory also includes two pseudonoise (PN) codes, namely a first PN code and a second PN code. Instructions stored in the memory of the device are executable to perform various tasks. The site monitoring data is received from the site monitoring system. The site monitoring data is spread using the first PN code to provide first spread site monitoring data. The first spread site monitoring data is spread using the second PN code to provide second spread site monitoring data. The second spread site monitoring data is transmitted using a burst direct sequence spread spectrum radio signal. In one embodiment, the device is a mobile device.

In some embodiments, the site monitoring data received by the communication interface from a site monitoring system was transmitted by a security device. In further embodiments, the site monitoring data includes data received from an access control device, a security camera, and/or a motion detector.

The site monitoring data received by the communication interface from the site monitoring system, in some embodiments, includes wireless signals. In other embodiments, the site monitoring data received by the communication interface includes signals transmitted over a wired medium. The site monitoring data transferred through the communication interface is transmitted to at least one base station.

In some embodiments, wireless signals are received by the communication interface from the site monitoring system using ultra wideband radio signals. In other embodiments, the site monitoring data received by the communication interface from the site monitoring system are received over a network using mesh networking. In other embodiments, the site monitoring data received by the communication interface from the site monitoring system are received over a WLAN wireless network. In still other embodiments, the site monitoring data received by the communication interface from the site monitoring system are received using a wired connection such as Ethernet or other wired connection.

The communication interface, in some embodiments, is configured to communicate directly with a security device to then transmit signals that include site monitoring data from the device to at least one base station. In other embodiments, the communication interface is configured to communicate with an antenna for receiving signals from a site monitoring system to then transmit signals that include site monitoring data from the device to at least one base station.

A system for site monitoring which includes a site monitoring system is disclosed. The site monitoring system includes at least one security device. The site monitoring system is configured to transmit site monitoring data that includes at least one security device identification. The system also includes at least one device that is configured to transmit its device identification and the site monitoring data. Each device performs two spreading operations on the site monitoring data with two distinct PN codes, namely a first PN code and a second PN code. Each device may also transmit the spread site monitoring data using a burst direct sequence spread spectrum radio signal. The devices may be, depending on the particular embodiment, stationary devices, relatively stationary devices, or mobile devices.

The system for site monitoring also includes at least one base station. Each base station is configured to receive the burst direct sequence spread spectrum radio signal that includes site monitoring data from the devices. Each base station is also configured to decode the signal by first de-spreading with the second PN code, second applying any needed frequency correction, and third de-spreading with the first PN code.

In some embodiments, each base station is further configured to provide the despread, demodulated and decoded site monitoring data with other information to a system for processing the despread, demodulated and decoded data. In other embodiments, the system for site monitoring includes a system for processing the despread, demodulated and decoded site monitoring data. The system for processing the despread, demodulated and decoded site monitoring data is configured to store the site monitoring data and to provide an interface for other systems to access the site monitoring data.

Processing the despread, demodulated and decoded data, in some embodiments, includes associating the site monitoring data with site identification. In other embodiments processing the despread, demodulated and decoded site monitoring data includes sending a security alert to a client via a network operations center. The security alert, in some embodiments, includes at least an email message to be forwarded to a client, a voice message to be forwarded to a client, or an email message to be forwarded to a service provider. The security alert, in some embodiments, may include a warning message to be delivered through the site monitoring system included as a system for processing the despread, demodulated and decoded site monitoring data.

Various embodiments of the invention are now described with reference to the Figures, where like reference numbers may indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Moreover, the methods, apparatus, and embodiments disclosed herein may provide advantages over previously known systems. Some of these advantages include very low cost, low power consumption (and thus longer battery life) for the tracking device, more effective site monitoring, indoor and outdoor tracking ability, as well as the capability of very long range data telemetry (with ranges of miles to tens of miles in typical areas). Such features may, in some embodiments, provide advantages over the previously known site monitoring systems because such previously known systems that are reasonably priced often have little range.

Furthermore, the present systems may have advantages over currently known long-range site monitoring systems because such currently known systems typically have high costs and require frequent battery-replacement Likewise, the present systems may have advantages over currently known systems using Global Positioning System (GPS) technology in that these GPS systems are higher cost, have shorter battery life, and are limited in their ability to track devices indoors.

FIG. 1 is a block diagram of an embodiment of a system 100 for site monitoring through the use of burst Direct Sequence Spread Spectrum (DSSS) radio signals. In the present embodiment, a Burst DSSS Radio System 101 is in electronic communication with a site monitoring system 121. The Burst DSSS Radio System 101 will be discussed in more detail in connection with the discussion of FIG. 4.

The site monitoring system 121, in the present embodiment, may communicate with the Burst DSSS Radio System 101 using wired connections such as Ethernet or other wired communications and wireless connections such as Bluetooth, ZigBee, WLAN, or other radio signals. These wired or wireless communications may be either simplex or duplex. A site monitoring system 121 may also include relay devices (not shown) to receive data from simple security devices and transmit the data to a device. The site monitoring system 121 may transmit site monitoring data 123 to the Burst DSSS Radio System 101. The Burst DSSS Radio System 101 may transmit configuration data 125 to the site monitoring system 121.

Figure 2:
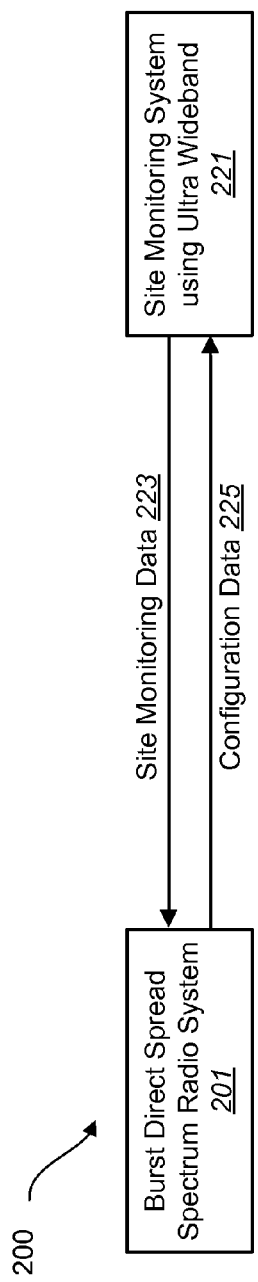
FIG. 2 is a block diagram of another embodiment of a system for site monitoring through the use of burst DSSS radio signals and ultra wideband radio signals.

FIG. 2 is a block diagram of another embodiment of a system 200 for site monitoring through the use of burst DSSS radio signals and ultra wideband radio signals. As in the Burst DSSS Radio System 101 of the embodiment shown in FIG. 1, the Burst DSSS Radio System 201 in the present embodiment is in electronic communication with a site monitoring system 221. The site monitoring system 221 may transmit site monitoring data 223 to the Burst DSSS Radio System 201. The Burst DSSS Radio System 201 may transmit configuration data 225 to the site monitoring system 221. The site monitoring system 221 of the present embodiment may communicate with the Burst DSSS Radio System 201 using ultra wideband radio signals.

Figure 3:
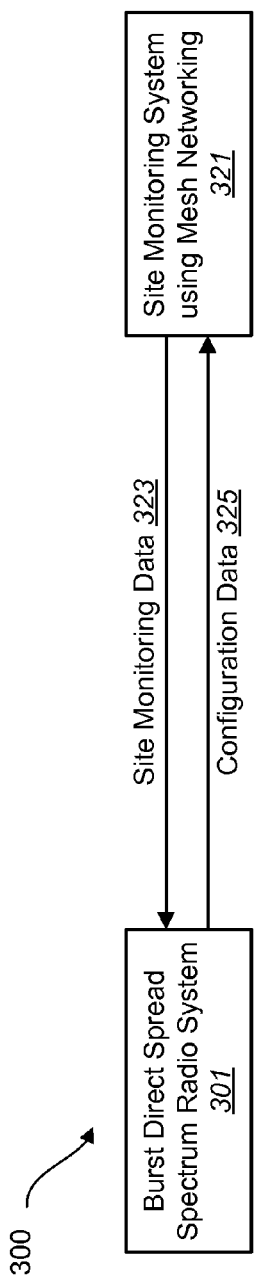
FIG. 3 is a block diagram of a further embodiment of a system for site monitoring through the use of burst DSSS radio signals and mesh networking.

FIG. 3 is a block diagram of a further embodiment of a system 300 for site monitoring through the use of burst DSSS radio signals and mesh networking. The Burst DSSS Radio System 301 of the present embodiment, similar to the Burst DSSS Radio Systems 101, 201 of the embodiments shown in FIGS. 1 and 2, is in electronic communication with a site monitoring system 321. The site monitoring system 321 may transmit site monitoring data 323 to the Burst DSSS Radio System 301. The Burst DSSS Radio System 301 may transmit configuration data 325 to the site monitoring system 321. The site monitoring system 321 of the present embodiment may communicate with the Burst DSSS Radio System 301 using mesh networking.

Figure 4:
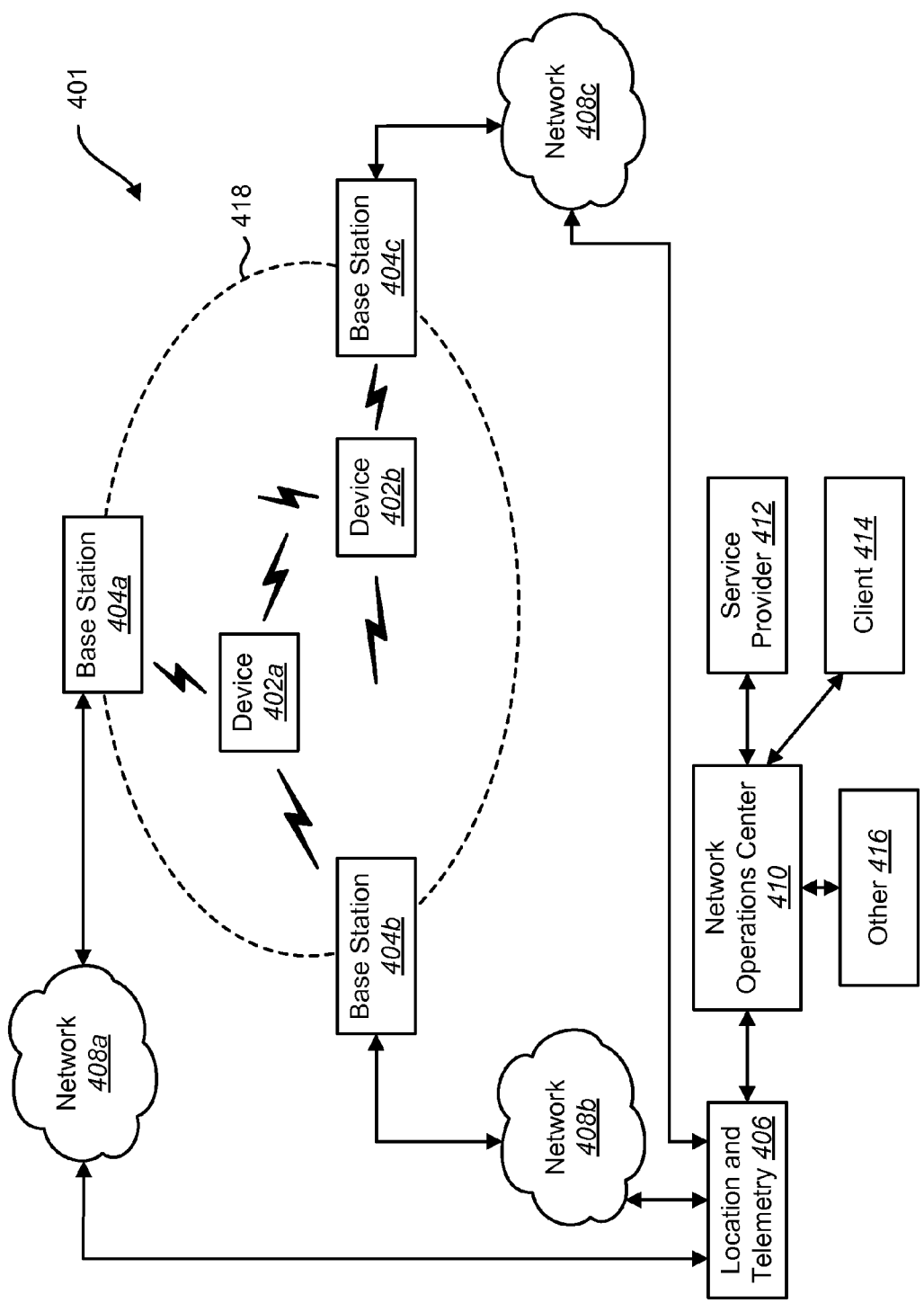
FIG. 4 is a block diagram of an embodiment of a Burst DSSS Radio System.

FIG. 4 is a block diagram of an embodiment of a Burst DSSS Radio System 401. The Burst DSSS Radio System 401 comprises a plurality of devices 402. Each device 402 is a radio frequency device that transmits burst DSSS radio signals, which are simultaneously received and processed by multiple receiver base stations 404. The devices 402 may receive site monitoring data 123 from a site monitoring system 121 and transmit the site monitoring data 123 to a base station 404. The devices 402 may be mobile devices, such as a radio frequency device that transmits burst DSSS radio signals. The devices 402 may also be stationary.

The base stations 404 are time synchronized using a number of techniques including but not limited to GPS time transfer, synchronization to a central radio beacon such as public broadcast or custom beacon, or synchronization to a timing reference transmitted over wire or optical cable. Also, each received burst may be time stamped marking the first to arrive signal by differentiating between the first to arrive and any multipath signals. The base station 404 may transmit site monitoring data 123 to the location and telemetry system 406. The base stations 404 and location and telemetry system 406 may provide geo-location and data telemetry functionality.

Location information may be created at the location and telemetry system 406 by calculating the Time Difference of Arrival (TDOA) of the received burst for each base station 404. The base stations 404 are in electronic communication with the location and telemetry system 406 through one or more networks 408, which in some embodiments, may be an IP network. Other types of networks 408 may also be used. An IP network is an Internet Protocol network, which is known in the art.

The location and telemetry system 406 may, in some embodiments, provide additional functions including signal enhancement. In other embodiments, the location and telemetry system 406 may provide monitoring functions. Such monitoring functions may include monitoring the base station 404 or monitoring the performance of the network 408 (such as monitoring the signal strength, the location accuracy, etc.). In further embodiments, the location and telemetry system 406 may process and store site monitoring data 123 received from a base station 404, and may transmit security alerts to the network operations center 410. The location and telemetry system 406 may receive site monitoring data from the site monitoring system 121 and may transmit configuration data 125 to the site monitoring system 121 via a base station 404 and a device 402.

A network operations center 410 is in electronic communication with the location and telemetry system 406. The network operations center 410 may provide access to the information and services of the location and telemetry system 406. As part of the network operations center 410, a database and application server may store the telemetry data and associated location information for end-user retrieval. Service providers 412 may be in communication with the network operations center 410 to provide services to third parties. For example, service providers 412 may include, but are not limited to, emergency response units, such as ambulances, the police department, or fire department, or may include asset monitoring and/or tracking services. Clients 414 may be in communication with the network operations center 410 to access the information and/or services available at the network operations center 410. For example, after receiving a security alert, a client 414 may remotely access the network operations center 410 to obtain additional information regarding the alert. Other 416 systems may also use the network operations center 410. A client 414 may receive security alerts and transmit configuration data 125 to the site monitoring system 121 via the Burst DSSS Radio System 101.

Many applications that require geo-location and data telemetry services are cost sensitive, size constrained, and require long battery life. This is especially true of the emerging machine-to-machine (M2M) applications that serve to wirelessly connect, monitor, and locate a multitude of machines and devices. Furthermore, many M2M applications may require long-range wireless connectivity to adequately address large-area (e.g. 100's of square miles) deployment objectives.

Many short-range wireless standards have been developed such as Bluetooth and ZigBee to support data transmission, but these systems typically do not provide adequate range for long-range M2M applications and they do not provide geo-location capabilities. Long-range wireless systems such as traditional wireless or cellular systems do not adequately address these M2M applications either, because they often include unnecessary complexity and high costs in order to support complex human interfaces and applications such as voice traffic or data streaming that require high bandwidths.

The aforementioned systems and other disclosed and implemented systems fail to simultaneously achieve the long range, low cost, and low battery power objectives required by M2M applications.

The present systems and methods include low cost and simple wireless devices 402 that communicate with processing power rich, intelligent, high-gain base stations 404 to serve geo-location and data telemetry applications. When taken as a whole, the burst DS SS Radio System 401 provides dramatically increased range and penetration while simultaneously lowering the cost of the devices 402 and extending device battery life due to the burst mode radio operation. Furthermore, the present systems and methods may utilize multiple base stations 404 in concert to increase in-building penetration and wide-area coverage when compared to other long-range wireless networks. The result is a system that is capable of covering large geographic areas with very few base stations 404 while the device 402 cost, complexity, and power consumption are kept low.

When wireless device 402 transmissions occur, the signal may travel at approximately 1 ft/nS (1 foot per nanosecond) to each of the network base stations 404. Each base station 404 may continuously monitor the Radio Frequency (RF) spectrum for device 402 transmissions. Additional base stations 404 deployed in a given area may result in a more accurate device position determination. For each device 402 DSSS transmission burst, all base stations 404 within range may receive and process the radio burst. The received DSSS pseudonoise (PN) burst signal is demodulated at each base station 404 to determine the device identification and extract the transmitted data, which may include site monitoring data 123. Each base station 404 may also record the time of arrival of the radio burst relative to the synchronized timing reference. The time-of-arrival, or time stamp, information and demodulated data, which may include site monitoring data 123, may then be forwarded to the location and telemetry system 406. Other information including signal and time-stamp quality may also be sent to the location and telemetry system 406 for network monitoring and system performance enhancement purposes. Other types of information sent by devices 402 and base stations 404 will be discussed below.

The location and telemetry system 406 may utilize the time stamps generated by the individual base stations 404 to calculate the TDOA location for each device 402 transmission burst. The closer the transmission path is to line-of-sight (LOS) the better the transmission efficiency and ability to perform location fixing may be because the accuracy of the time stamps improves with LOS paths. Non-line-of-sight (NLOS) propagation paths may provide one of the greatest challenges to accurately determining position using TDOA systems. Traditional radio receiver implementations typically work with the strongest arriving signal. However, if the strongest received radio signal from a device 402 takes a NLOS path to a base station 404, the extra time it takes to traverse that path may make that device 402 seem further away from the base station 404, creating a miscalculation. Each base station 404 receives and time stamps discernable signals including LOS and NLOS signals. This allows each base station 404 to uniquely identify the signal that is most likely to be the LOS signal from NLOS signals and to optimally combine the LOS signal with NLOS signals to both improve data demodulation capability and to correctly identify the most likely LOS signal component for more accurate location processing. Furthermore, LOS and NLOS time stamps and their relative quality estimates may be used by the location and telemetry system 406 to optimally combine the time stamps from multiple base stations 404 to improve location accuracy calculations.

Another source of TDOA error may result from the non-linear effects that occur when solving the hyperbolic TDOA equations. These effects typically result from errors in the timing of the direct path that produces errors in the position calculation. Errors due to NLOS paths may occur when there is no line of site path available. When NLOS paths are necessarily used for the calculation of TDOA because no line of site path is available, the error may be higher since the NLOS path is delayed in time from the timing of a line of site path. It is desirable for the device to be received by more than three base stations 404 since this would increase the probability that at least three base stations were able to obtain LOS paths to the device 402 resulting in decreased probability of additional errors related to NLOS paths being used in the TDOA calculation. It is also desirable that the device 402 be received by more than three base stations 404 to reduce the probability that the device 402 is in an area where hyperbolic errors are large. The disclosed systems and methods may use all available data from base stations 404 within range of the device transmission to improve the location accuracy calculation performed within the location and telemetry system 406.

The present systems and methods can accommodate many simultaneous users in a single frequency band because the very long PN code provides a high processing gain (38 dB for the preferred embodiment) yielding superior anti-jam (AJ) performance. In order to uniquely separate the individual transmissions they must arrive at the receiver offset in time by at least two DSSS chips and the power levels of the transmissions arriving at each base station 404 receiver should not exceed the AJ capabilities of the Burst DSSS Radio System 401. The large processing gain may provide superior interference rejection against other strong signals operating in the same frequency band.

In order to preserve device battery power, the time taken for a device 402 to become transmit ready and successfully transmit may be short.

The block diagram of FIG. 4 also illustrates the coverage area 418. The coverage area 418 is the area in which devices 402 operate and their location can be determined and their data can be received through the present systems and methods. In the current embodiment, wireless signals from the device 402 may be received by at least three base stations 404 in order for the location and telemetry system 406 to accurately determine the location of the device 402. Although the system may work with less than three base stations 404, the location information may not be as accurate as it would be if three or more base stations 404 were used. For data telemetry, such as transmitted site monitoring data, the signals typically need only be received at one base station 404, though more base stations may receive the data.

Additional embodiments may be constructed in which the location of the device 402 is stationary (i.e., permanently positioned in one location) or "relatively stationary" with respect to the time between device 402 transmissions and the distance the device 402 moves in said time. "Relatively stationary" with respect to the time between device 402 transmissions means that the device does not move more than a pre-determined distance relative to the location accuracy desired. For example, if the location accuracy desired is within 30 feet, then to be relatively stationary would mean that the device does not move more than 30 feet in between transmissions.

In the embodiments in which the location of the device 402 is stationary or relatively stationary, the location and telemetry system 406 may ascertain the location of the device 402 using information obtained from at least three base stations 404. However, the information obtained from the three base stations 404 does not have to be information related to the same emitted signal. Rather, one or more of the base stations 404 may provide information regarding the device 402 that was previously gathered (i.e., information that was gathered from a previous signal emission). However, because the device 402 is stationary or relatively stationary, the timestamp derived from this previous signal is still accurate and may be used by the location and telemetry system 406 to determine the position of the device 402. Further embodiments may use information previously gathered by one or more of the base stations 404 as a means of improving and/or checking the calculations performed by the location and telemetry system 406.

In an alternative embodiment, the signals emitted by the device 402a are received only by one of the base stations—i.e., base station 404a—and not the other base stations 404b, 404c. The reason that device 402a may not communicate with the base stations 404b, 404c is that the device 402a falls outside the range of these base stations 404b, 404c. In other embodiments, the device 402a may not be able to communicate with the base stations 404b, 404c because the signal is heavily attenuated by physical clutter such as buildings (or other physical/geographical barrier), interference, etc.

Because the signals emitted by the device 402a, in the alternative embodiment, are received by the base station 404a, these signals may be used by the location and telemetry system 406 to acquire data telemetry information regarding the device 402a. However, because the signals from the device 402a are only received by the base station 404a, the location determination made by the location and telemetry system 406 may not be as accurate as would otherwise be the case if the base stations 404b and 404c also received the signal. In fact, the location determination that may be made from the signals received only by the base station 404a is that the device 402a is within range of the base station 404a and/or that the device 402a is positioned a specified distance away from the base station 404a. This type of "less-precise" location determination may be sufficient in certain applications where it is adequate to know that the device 402a is in a specific area rather than the precise location. For example, a shipper may only want to know that the container is within range of a certain port, not the exact location of the container within the port itself. Accordingly, in such applications, only one base station 404a may be needed to communicate with the device 402a and provide the requisite location information.

Figure 5:
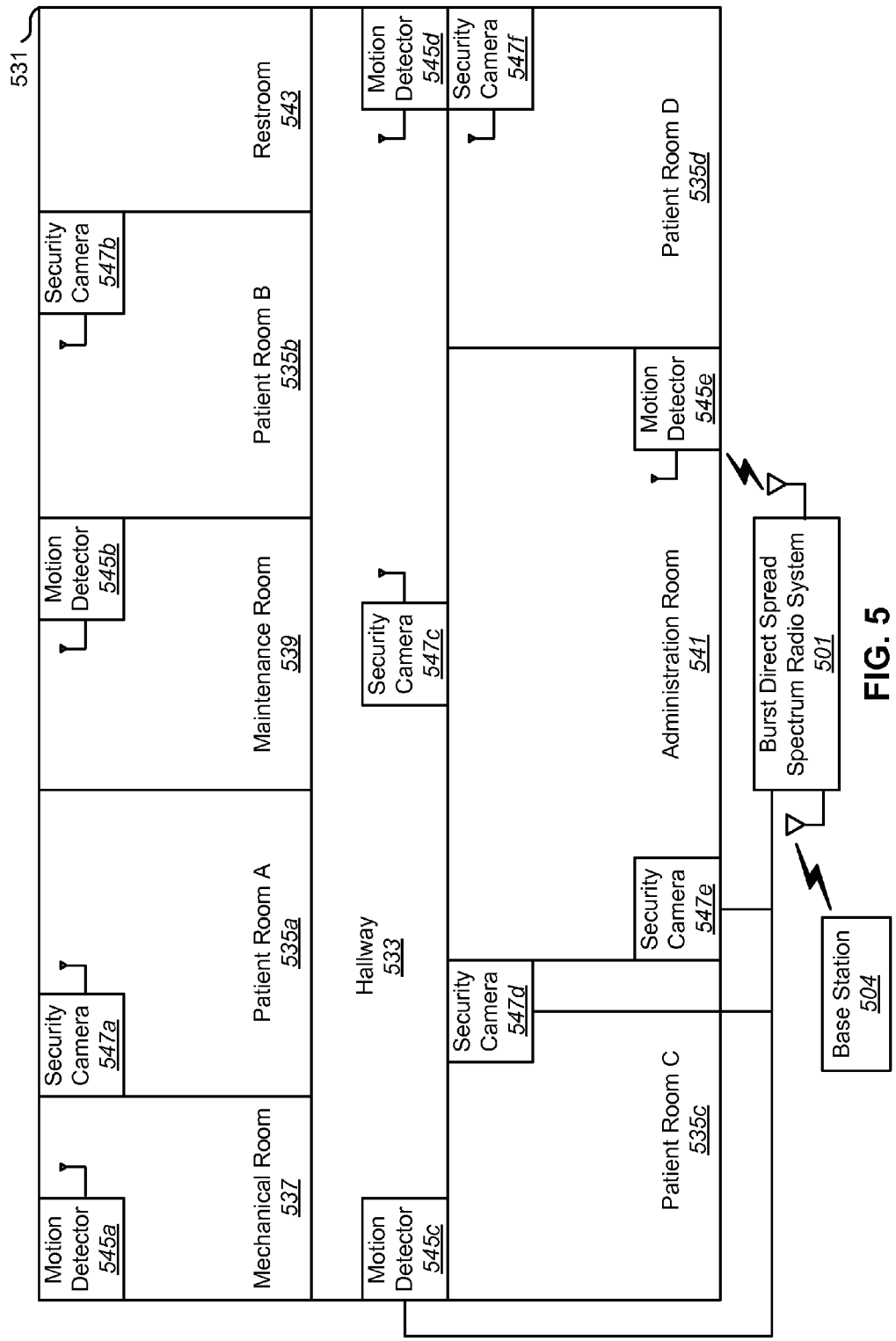
FIG. 5 illustrates an exemplary site for monitoring in which the present systems and methods may be implemented.

FIG. 5 illustrates an exemplary site 531 for monitoring in which the present systems and methods may be implemented. The exemplary site 531 may represent a nursing home. The site 531 may include various rooms and a hallway 533, which typically include doors (not shown) to access the rooms and hallway 533. In the present example, the rooms include patient rooms 535, a mechanical room 537, a maintenance room 539, an administration room 541, and a restroom 543.

The site 531 may include a site monitoring system 121, which may also include various security devices such as motion detectors 545 and security cameras 547. Other security devices, such as door and window sensors, glass break sensors, access control devices, heat sensors, smoke detectors, carbon monoxide detectors, etc., may be used. However, the present example is described using motion detectors 545 and security cameras 547. Many different kinds of electronic devices may be used in a multitude of arrangements/configurations. The patient rooms 535 in the site 531 may include security cameras 547, which may allow monitoring of the patients in order to assess whether a patient is in distress. The patient rooms 535 may alternatively include a motion detector 545 or other security device as desired.

The mechanical room 537 and maintenance room 539 may include motion detectors 545 to prevent unauthorized access to the rooms or their contents. The administration room 541 of the present example includes both a security camera 547 and a motion detector 545. The hallway 533 may include a combination of motion detectors 545 and security cameras 547. Various combinations of security devices may be incorporated into the rooms and hallway of the site 531 to achieve desired security or monitoring goals.

The motion detectors 545 and security cameras 547 in the present example may be capable of wireless transmission of data or may be hardwired to communicate with the Burst DSSS Radio System 501. In the present example, one motion detector 545 in the hallway 533, the security camera 547 in Patient Room C 535c, and the security camera 547 in the Administration Room 541 are in hardwired electronic communication with the Burst DSSS Radio System 501, while the remaining security devices are in wireless electronic communication with the Burst DSSS Radio System 501. As described in connection with FIGS. 1, 2, and 3, the site monitoring system 121 may communicate electronically with the Burst DSSS Radio System 501 using a variety of methods including Bluetooth technology, ultra wideband radio signals, mesh networking, etc. The Burst DSSS Radio System 501 may then process the site monitoring data 123 received from the site monitoring system 121 and may transmit configuration data 125 to the site monitoring system 121. The Burst DSSS Radio System 501 may communicate with one or more base stations 504 as shown.

Figure 6:
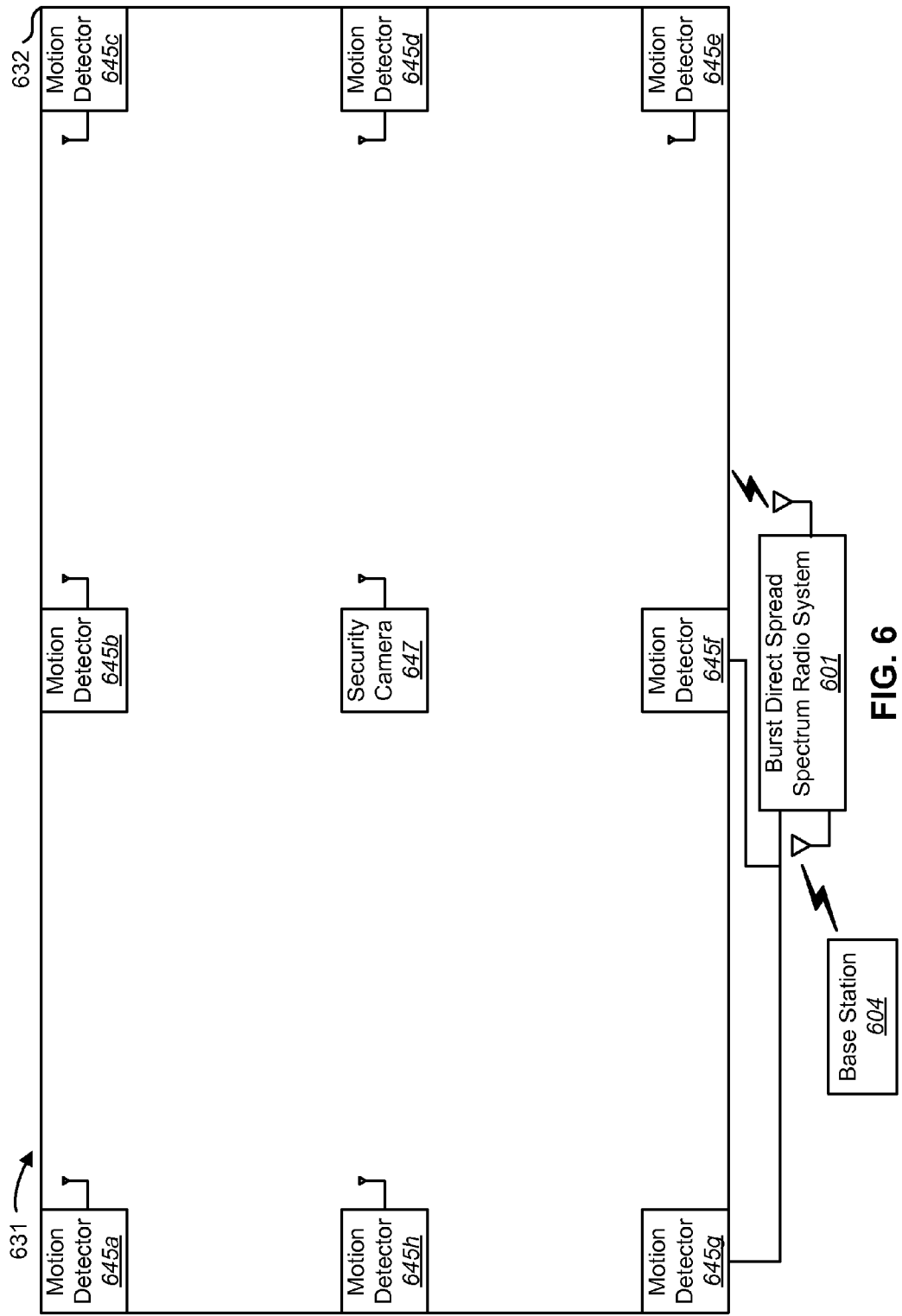
FIG. 6 illustrates another exemplary site for monitoring in which the present systems and methods may be implemented.

FIG. 6 illustrates another exemplary site 631 for monitoring in which the present systems and methods may be implemented. The present exemplary site 631 may represent an airport. The site 631 may have a secure perimeter 632 that is monitored by a site monitoring system 121. The site monitoring system 121 may include various security devices, similar to the exemplary site shown in FIG. 5, including motion detectors 645 and a security camera 647. In the present example, the perimeter 632 is monitored. In order to monitor the perimeter 632, the motion detectors 645 may use passive infrared sensors, active infrared sensors, ultrasonic sensors, range controlled radar sensors, photoelectric sensors, contact sensors, and so forth. The motion detectors 645 of the present example use passive infrared sensors to detect whether the perimeter has been breached. The security camera 647 of the present example may be used to identify what has breached the secure perimeter 632. As in the previous exemplary site 531, the motion detectors 645 and security cameras 647 in the present example may be capable of wireless transmission of data or may be hardwired to communicate with the Burst DSSS Radio System 601. In the present example, the motion detectors 645*f* in the southwest corner and the nearest motion detector 645*g* to the east are hardwired to the Burst DSSS Radio System 601.

When a motion detector 645 detects that the perimeter has been breached, the motion detector 645 or site monitoring system 121 may send a signal to the Burst DSSS Radio System 601 wirelessly or over a hardwired connection using a variety of methods including Bluetooth technology, ZigBee wireless technology, WLAN, ultra wideband radio signals, mesh networking, etc. The Burst DSSS Radio System 601 may communicate with one or more base stations 604 as shown.

Figure 7:
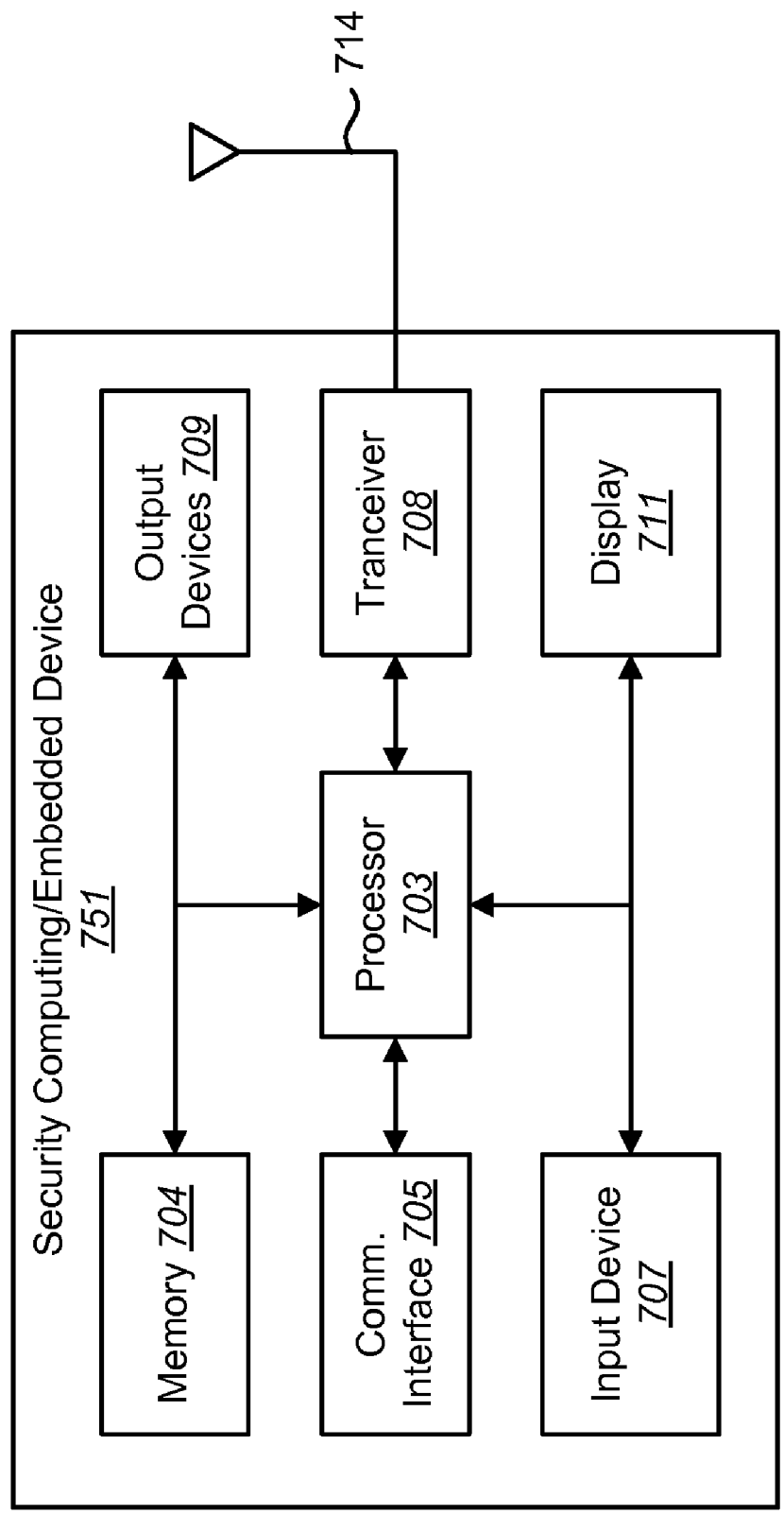
FIG. 7 is a general block diagram of hardware components that may be used with embodiments of a security device.

FIG. 7 is a general block diagram of hardware components that may be used with embodiments of a security device 751. As discussed above, security devices 751 may include motion detectors 545, 645, security cameras 547, 647, door and window sensors, glass break sensors, access control devices, heat sensors, smoke detectors, carbon monoxide detectors, and so forth.

Typically, a security device 751 is a simple device that may require very few of the elements shown in FIG. 7. Often a simple security device 751 may only require an input device 707 and an output device 709. For example, with a simple motion detector 751, the input device 707 may be a passive infrared sensor and the output device 709 may be a wired connection to the Burst DSSS Radio System 101. Simple motion detectors 545 are typically low-voltage units and as such, may run for long periods of time without the need to recharge or replace a battery. Another example may connect the output device 709 of the motion detector 545 to another device that is capable of interpreting and transmitting the data received from the motion detector 545 to the Burst DSSS Radio System 101.

Smarter security devices 751, such as a security camera 547, may include more of the elements shown in FIG. 7. For example, a security camera 547 may be remotely controllable, or may be capable of tracking the movements based on information received from a motion-tracking device, such as a motion detector 545, to obtain information about the potential security breach, which may require more sophisticated control of the security camera 547. More sophisticated control may require using a processor 703, memory 704, a communications interface 705, multiple input devices 707, multiple output devices 709, a display 711, and a display controller (not shown). The processor 703 may also be referred to as a CPU. The processor 703 may be embodied as a microprocessor, a microcontroller, a programmable gate array or integrated circuit, a digital signal processor (DSP) or other device known in the art. The processor 703 typically performs logical and arithmetic operations based on program instructions, or logical definitions, stored within the memory 704 or circuits contained within the processor 703. The processor 703, in the example of a remotely controlled security camera, may be used to process image data. For example, the processor 703 may be used to compress the image data in preparation for transmitting the data to the Burst DSSS Radio System 101.

Memory 704, which may be used for smarter security devices 751, may include both read-only memory (ROM) and random access memory (RAM). The memory 704 provides instructions and data to the processor 703. A portion of the memory 704 may also include non-volatile random access memory (NVRAM). As used herein, the term "memory" 704 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 704 typically stores program instructions and other types of data. The program instructions may be executed by the processor 703 to implement some or all of the methods disclosed herein. For example, the memory 704 may include program instructions for compressing image data or actuating the remote control components in a security camera 547.

A smart security device 751 typically also includes one or more input devices 707 and one or more output devices 709. Typical input devices for a security device 751 may include security sensors like a passive infrared sensor or other sensor as described above, however smart security devices 751 may also include one or more buttons or switches as input devices 707, which may be used to calibrate the more sophisticated devices. More complex input devices are possible.

Because simple security devices 751 typically are lower cost devices, the output device 709 is usually a low cost output device, such as one or more LEDs and/or a speaker. However, as discussed above, for simple security devices 751, the output device may simply be a wired connection to the Burst DSSS Radio System 101 or another device capable of interpreting and transmitting the data from the simple security device 751 to the Burst DSSS Radio System 101. Smart security devices 751 may include more complex output devices 709. Examples of different kinds of output devices 709 may include an LCD screen, a speaker, printer, etc.

A transceiver 708 may be included to allow transmission of data between the security device 751 and the Burst DSSS Radio System 101. For example, the transceiver 708 may transmit compressed image data to the Burst DSSS Radio System 101. The transceiver 708 may also receive data, for example, configuration data 125 for a remotely controlled security camera 547, from the Burst DSSS Radio System 101. An antenna 714 may also be attached to the security device 751 and be electrically coupled to the transceiver 708. Additional antennas (not shown) may also be used. As discussed above, in some embodiments of a security device 751, the transceiver 708 may be replaced with or complemented by an output device 709 such as a simple wired connection.

Smart security devices 751 may also include one or more communication interfaces 705 for communicating with other electronic devices. The communication interfaces 705 may be based on wired communication technology, wireless communication technology, or both. Examples of different types of communication interfaces 705 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a ZigBee wireless communication adapter, WLAN, an ultra wideband wireless communication adapter, and so forth.

Another example of a smart security device 751 may include an access control device. Access control devices may determine whether a person or item has permission to enter an area. An access control device may include RFID sensors, biometric sensors, and so forth. When access is granted or denied by an access control device, the data may be transmitted to a device 402 as site monitoring data 123.

Figure 8:
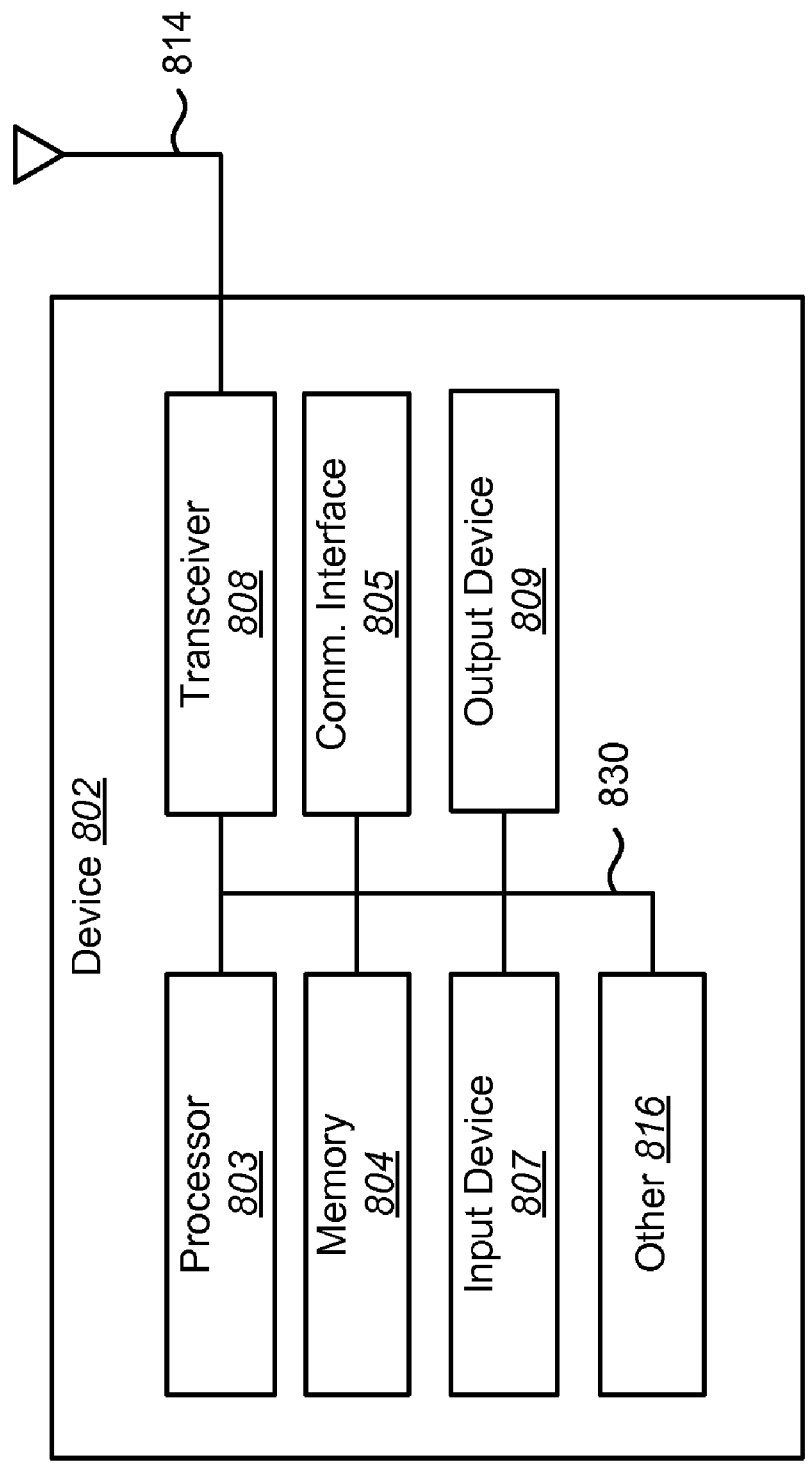
FIG. 8 is a general block diagram of hardware components that may be used with embodiments of a device.

FIG. 8 is a general block diagram of hardware components that may be used with embodiments of a device 802. The device 802 includes a processor 803, which controls operation of the device 802. As with the processor 703 used by smart security devices 751, the processor 803 in a device 802 may be embodied as a microprocessor, a microcontroller, a programmable gate array or integrated circuit, a digital signal processor (DSP) or other device known in the art. The processor 803 typically performs logical and arithmetic operations based on program instructions, or logical definitions, stored within the memory 804 or circuits contained within the processor 803.

Memory 804, which may include both read-only memory (ROM) and random access memory (RAM), provides instructions and data to the processor 803. A portion of the memory 804 may also include non-volatile random access memory (NVRAM). The memory 804 typically stores program instructions and other types of data. The program instructions may be executed by the processor 803 to implement some or all of the methods disclosed herein.

A transceiver 808 is included to transmit and receive data between the device 802 and the base station 404. The transceiver 808 may also be used to transmit and receive data from a site monitoring system 121 or directly from a security device 751. An antenna 814 may be attached to the device 802 and is electrically coupled to the transceiver 808. Additional antennas (not shown) may also be used. In some embodiments, the transceiver 808 may only transmit and not receive data. For example, in embodiments where simplex communications are used, the transceiver 808 may be replaced with a transmitter.

The system may also include one or more communication interfaces 805 for communicating with other electronic devices. For example, the communication interfaces may be used to transmit and receive the data sent between the device 802 and the base station 404 or between the device 802 and the site monitoring system 121. The communication interfaces 805 may be based on wired communication technology, wireless communication technology, or both. Examples of different types of communication interfaces 805 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a ZigBee communication adapter, WLAN, an ultra wideband wireless communication adapter, and so forth. The communication interfaces 805 may be used to both send and receive data between the device 802 and the site monitoring system 121.

The device 802 typically also includes one or more input devices 807 and one or more output devices 809. Typical input devices for the device 802 may be one or more buttons or switches. More complex input devices are possible. Examples of different kinds of input devices 807 include a keyboard, mouse, microphone, remote control device, button, joystick, trackball, touchpad, lightpen, sensors, etc.

Because the device 802 is typically a low cost device, the output device 809 is usually a low cost output device, such as one or more LEDs, an LCD screen and/or a speaker. Of course, more complex output devices are possible. Examples of different kinds of output devices 809 include a speaker, printer, etc. One specific type of output device 809 which is typically included in a computer system is a display device (shown as output device). Display devices used with embodiments disclosed herein may utilize any suitable image projection technology, such as a cathode ray tube (CRT), liquid crystal display (LCD), light-emitting diode (LED), gas plasma, electroluminescence, or the like. A display controller may also be provided, for converting data stored in the memory 804 into text, graphics, and/or moving images (as appropriate) shown on the display device.

Of course, FIG. 8 illustrates only one possible configuration of hardware components that may be used. Other components 816 may also be included in the device 802. Various other architectures and components may be utilized. In addition, various standard components are not illustrated in order to avoid obscuring aspects of the invention. Additionally, the devices 802 may be mobile devices, such as a radio frequency device that transmits burst DSSS radio signals. The devices 802 may also be stationary.

The various components of the device 802 may be coupled together by a bus system 830, which may include a power bus, a control signal bus, and a status signal bus in addition to a data bus. However, for the sake of clarity, the various busses are illustrated in FIG. 8 as the bus system 830. The device 802 illustrated in FIG. 8 is a functional block diagram rather than a listing of specific components.

The device 802 may be embodied with and/or used in a number of different applications. In the present embodiment, the device 802 is used to transmit site monitoring data 123 to a base station 404 and transmit configuration data 125 to a site monitoring system 121 or security device 751. Other examples may include a company using the device 802 to monitor the location of their inventory, fleet of equipment, mobile assets, utility infrastructure, etc. The device 802 may also be used to sense/monitor the status of the equipment/ inventory/assets either in large areas or in closed quarters such as buildings, warehouses, etc. Other embodiments may use the device 802 to monitor the security/status of a stationary asset such as a building, vending machine, meter, etc. Still further embodiments of the device 802 may be used to monitor the status of individual persons, such as the status/location of an inmate in a prison, a parolee, a child, etc. Additional embodiments may use the device 802 as part of a telemedicine or telemedicine administration system. Further embodiments may be used in traffic control and highway maintenance systems. Governmental applications are also possible including security and/or location tracking for military bases or compounds, battlefields, airports, ports, borders, etc. as well as emergency response tracking/telemetry and other public safety applications. Other possible applications are also available.

Figure 9:
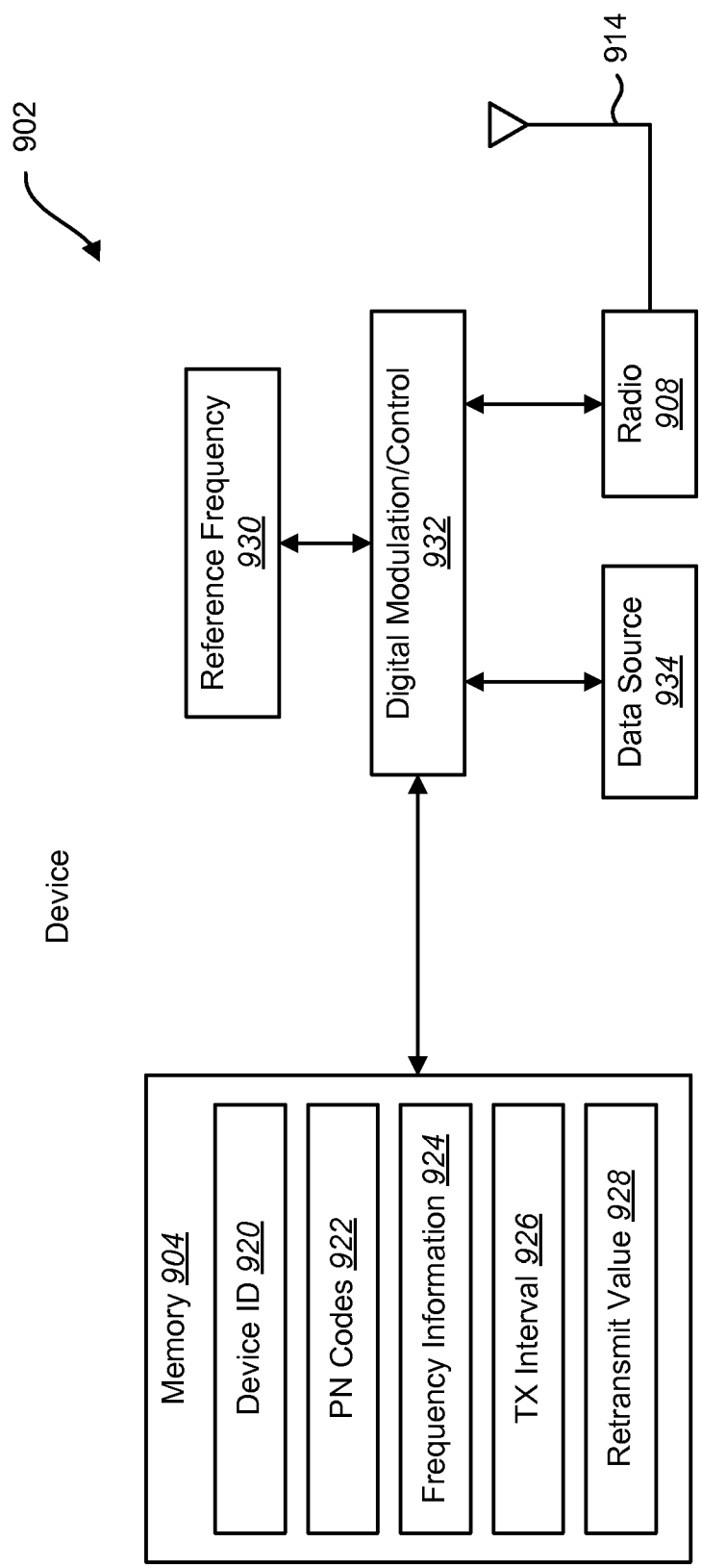
FIG. 9 is a functional block diagram of an embodiment of a device.

FIG. 9 is a functional block diagram of an embodiment of a device 902. The device 902 may be mobile, portable, or stationary. For example, the device 902 may be a mobile radio frequency device that transmits burst DSSS radio signals. The device 902 includes several pieces of data that are stored in the memory 904. A device identification 920 (device ID) is an identifier for the device 902. The device ID 920 may identify the individual device 902, the device type, the location of the device 902, or other characteristics about the device 902.

The PN codes 922 are the PN codes, or generator polynomials, that the device 902 may use to code the DSSS transmit data. The frequency information 924 is the radio frequency or frequencies on which the data is to be transmitted. The TX interval 926 is the average interval in between transmissions. The interval generator includes a method to randomize the transmit interval. The retransmit value 928 is the number of times that the data is to be transmitted to increase the probability of reception.

The reference frequency 930 is provided by a reference frequency oscillator (not shown). The digital modulation and control block 932 may control the reference frequency oscillator, which in turn directly affects the reference frequency 930.

The digital modulation and control block 932 performs the modulation of the data using the PN codes. The method of modulating the data will be described below. The digital modulation and control block may also perform device control including data management, radio control, input/output control, etc.

The data source 934 is the data to be modulated. The data source 934 includes the device ID 920 and may also include other information, such as the site monitoring data 123. As described above, the radio 908 may be used to transmit the data through use of the antenna 914.

Figure 10:
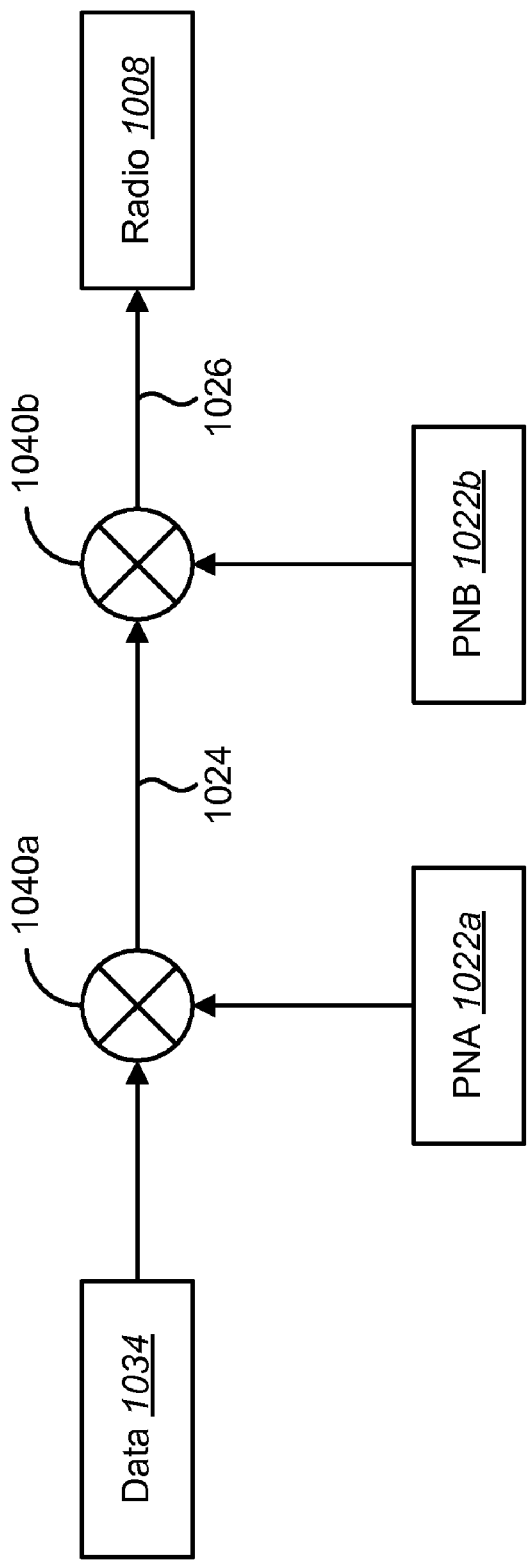
FIG. 10 is a functional block diagram of the spreading that occurs in the device.

FIG. 10 is a functional block diagram of the spreading that occurs in a device 402. The device 402 may perform two spreading operations. First the data 1034 is spread 1040a using a first PN code, PNA 1022a. Then the result 1024 may be spread 1040b using a second PN code, PNB 1022b. The final data 1026, after being spread twice, may be transmitted using the radio 1008.

Processing gain in spread spectrum communications can be used to increase link distance and margins in the presence of interference by reducing the impact of interference on the system's ability to accurately receive the desired signals or may be used to achieve the ability to simultaneously receive multiple signals, and is directly related to the length of the PN code used. For example a PN length of 1,000 yields a processing gain of 30 dB, while a PN length of 10,000 yields a processing gain of 40 dB, respectively.

The base stations 404 (shown in FIG. 4) may simultaneously receive signals from a multitude of devices 402 (shown in FIG. 4), each with a corresponding frequency error. This fact may preclude locking the receiver in the base station 404 to an individual device 402 to achieve frequency coherence across long PN sequences.

In order to achieve high processing gain with smaller implementation costs and in order to provide scalable data rates, this system may incorporate concatenated PN Sequences as shown in FIG. 10. Scalable data rates may be used in some embodiments, but may not be used in other embodiments. In one of the present embodiments, the PNA length is 7 and the PNB length is 1023 (as is shown below in Table 1). Of course, other alternative embodiments may be used (as described below) to achieve a specific scalable data rate range. Thus, the present embodiments include, but are not limited to, the examples of the codes listed below. Rather, other codes are available and may also be used. One example of an embodiment for a scalable data range may have data bits that are first spread 1040a from 1 to 31 chips by a variable PNA code 1022a. The resulting chips 1024 are further spread 1040b by a second fixed length PNB code 1022b. With a chipping rate of 5 Mega chips per second, the resulting data rates scale from 19.608 kbps to 326 bits/second with processing gains from 24 to 42 dB, respectively, depending on the application requirements and available link SNR. The receiver in the base station 404 may be architected such that devices 402 of all speeds may be received simultaneously.

Table 1 illustrates the various data rates that can be achieved corresponding to various PN lengths. Table 1 assumes 5,000,000 chips per second.

The length of the second PNB 1022b may be designed to be short enough such that the worst case frequency error plus doppler shift will cause no more than a predetermined amount of correlation loss. For example, in one of the presently preferred embodiments, 180 degrees of phase roll over PNB-length number of chips results in approximately 4.5 dB correlation loss in the first (PNB) matched filter.

The PN codes may be selected according to the desired processing gain and the data rate versus tolerance to frequency error and then optimizing for optimum code performance including, for example, low cross-correlation properties, signal-to-noise, etc. Other ways of selecting the PN codes may, of course, also be used.

Figure 11:
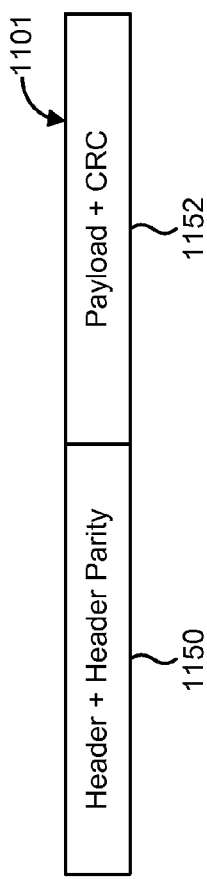
FIG. 11 is a block diagram of one general embodiment of a transmit packet.

The data that is to be transmitted may be formatted into transmit packets 1101. One general embodiment of a transmit packet 1101 is shown in FIG. 11. The transmit packet 1101 may include a header 1150 and a payload 1152. The header 1150 may include overhead and identification information about the transmit packet 1101, such as, synchronization information, device and packet identification, the size of the packet, the format of the payload, etc. The header 1150 may also include information that informs the base stations 404 that the received transmission is valid. The header 1150 may additionally include a CRC checksum for the header. The payload data 1152 may include the information to be transmitted and may include any site monitoring data 123 transmitted to the device 402 by a site monitoring system 121. The payload 1152 may include descriptors, error-correction mechanisms, and any other additional information along with data. Additionally, the payload data 1152 may include a CRC check.

Figure 12:
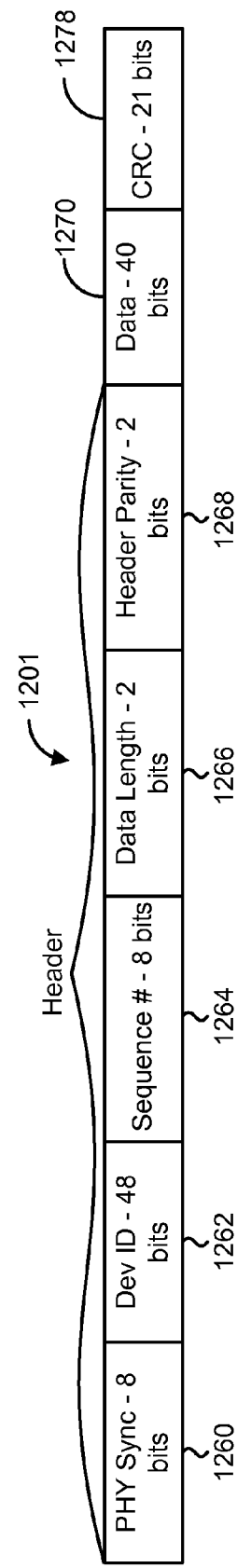
FIG. 12 is a block diagram of another embodiment of a transmit packet.

FIG. 12 is a block diagram of an embodiment of a transmit packet 1201. Other embodiments may expand or reduce the overall datagram length by incorporating encryption or other information as necessary or by increasing or decreasing the length of the data elements or other modifications to the packet structure.

At the physical layer, there is a PHY Sync header 1260 that may be 4 to 12 bits. This header may be used at the base station 404 to lock onto the signal, initialize the receiver in the base station 404, and to quickly determine whether a valid data packet is present. A device ID 1262 that operates to identify the device 402 (not shown in FIG. 12) may also be added. This device ID 1262 may be of various bit lengths. Additionally a sequence number 1264, a data length 1266, and a header parity 1268, each having a variety of bit lengths, may also be added. The data length 1266 indicates the length of the payload data. In some embodiments, the sequence number 1264 may be used to align the received packets into the proper order and as an anti-spoofing measure. The payload data 1270 may include data of a variety of bit lengths, including 40 bits. Also, the CRC check field 1278 may be added to the end of the payload data 1270.

Figure 13:
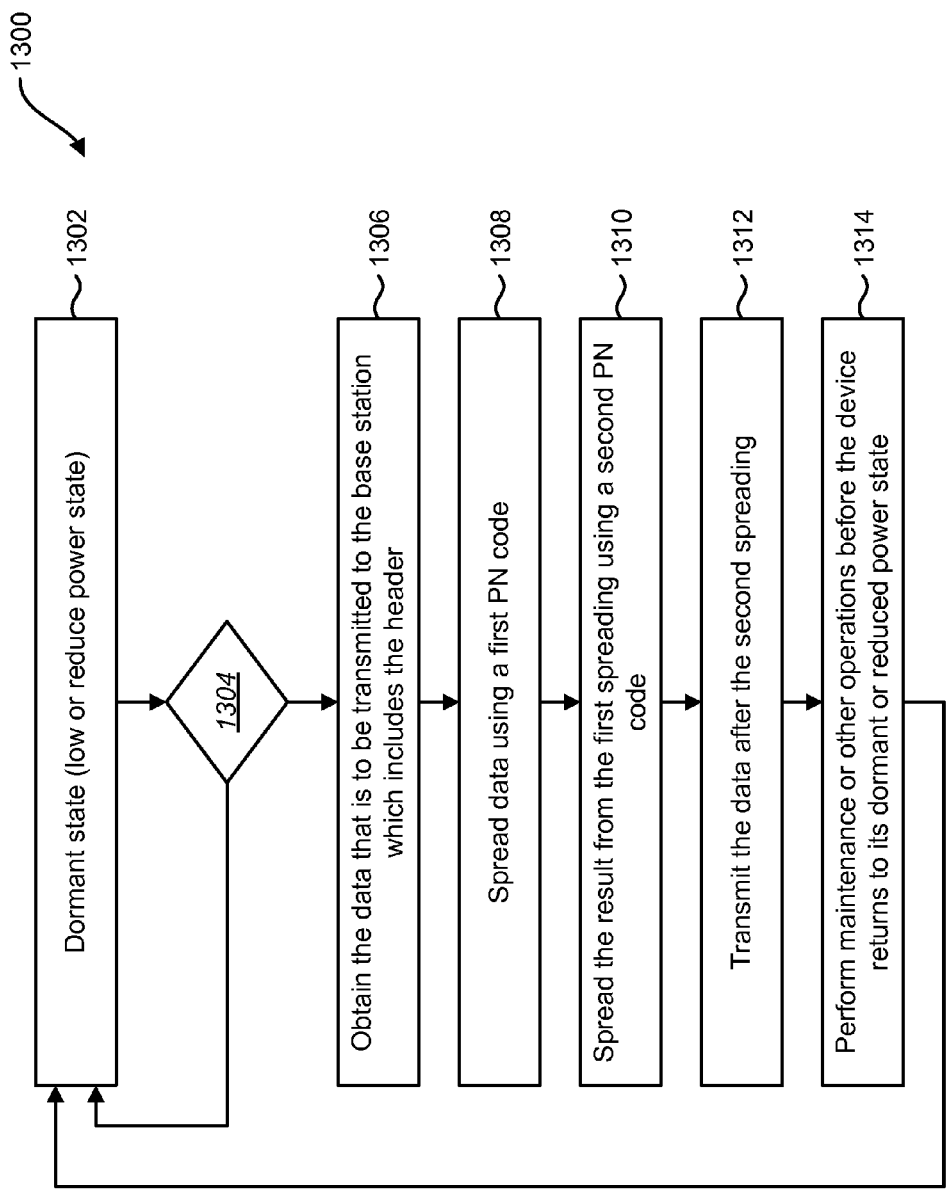
FIG. 13 is an embodiment of a method of operation for a device.

FIG. 13 is an embodiment of a method 1300 of operation for a device 402. The device 402 is in a dormant state 1302 for a portion of the time. The dormant state is typically a low or reduced power state that allows the device 402 to save power while not transmitting. A wakeup event 1304 or other trigger 1304 wakes up the device 402. The trigger 1304 could be a timer, an interrupt, or any other signal that may be used to pull the device 402 out of its dormant state. For example, the wake up event may be a signal transmitted by a site monitoring

TABLE 1

| PNA Length | 1 | 3 | 7 | 15 | 31 | 1 | 3 | 7 | 15 |
|---|---|---|---|---|---|---|---|---|---|
| PNB Length | 255 | 255 | 255 | 255 | 255 | 1023 | 1023 | 1023 | 1023 |
| Chips/Bit | 255 | 765 | 1785 | 3825 | 7905 | 1023 | 3069 | 7161 | 15345 |
| Processing Gain | 24 | 29 | 33 | 36 | 39 | 30 | 35 | 39 | 42 |
| Data Rate | 19608 | 6536 | 2801 | 1307 | 633 | 4888 | 1630 | 698 | 326 | system 121. Once out of its dormant state, the device 402 obtains 1306 the data that is to be transmitted to the base station 404 which includes the header information and may include any site monitoring data 123 transmitted by a site monitoring system 121.

As shown and discussed in relation to FIG. 9, the data is first spread 1308 by a first PN code, and then it is spread 1310 by a second PN code. The resulting data is then transmitted 1312 to at least one base station 404. Then maintenance or other operations, such as resetting a sleep timer, receiving configuration data 125 from the base station 404, transmitting configuration data 125 to the site monitoring system 121 or security devices 751, and so forth may be performed 1314 before the device 402 returns to its dormant or reduced power state 1302.

In one embodiment, the device 402 only transmits to but does not receive data from the base station 404. Thus, the communication is one-way (simplex transmission), from the device 402 to the base station 404. Because of this unidirectional design for this embodiment, there is no syncing requirement. That is, the device 402 does not have to be time synchronized with the base station 404. Furthermore, no protocols are required because there is no handshaking that takes place between the device 402 and the base station 404. Each device 402 transmits burst DSSS radio signals.

In an alternative embodiment, the device 402 transmits and receives data between the base station 404. Thus, the communication is two-way (duplex transmission), from the device 402 to the base station 404. Because of this bidirectional design for this embodiment, the device 402 may be time synchronized with the base station 404. Furthermore, protocols may also be used because there may be handshaking that takes place between the device 402 and the base station 404.

Figure 14:
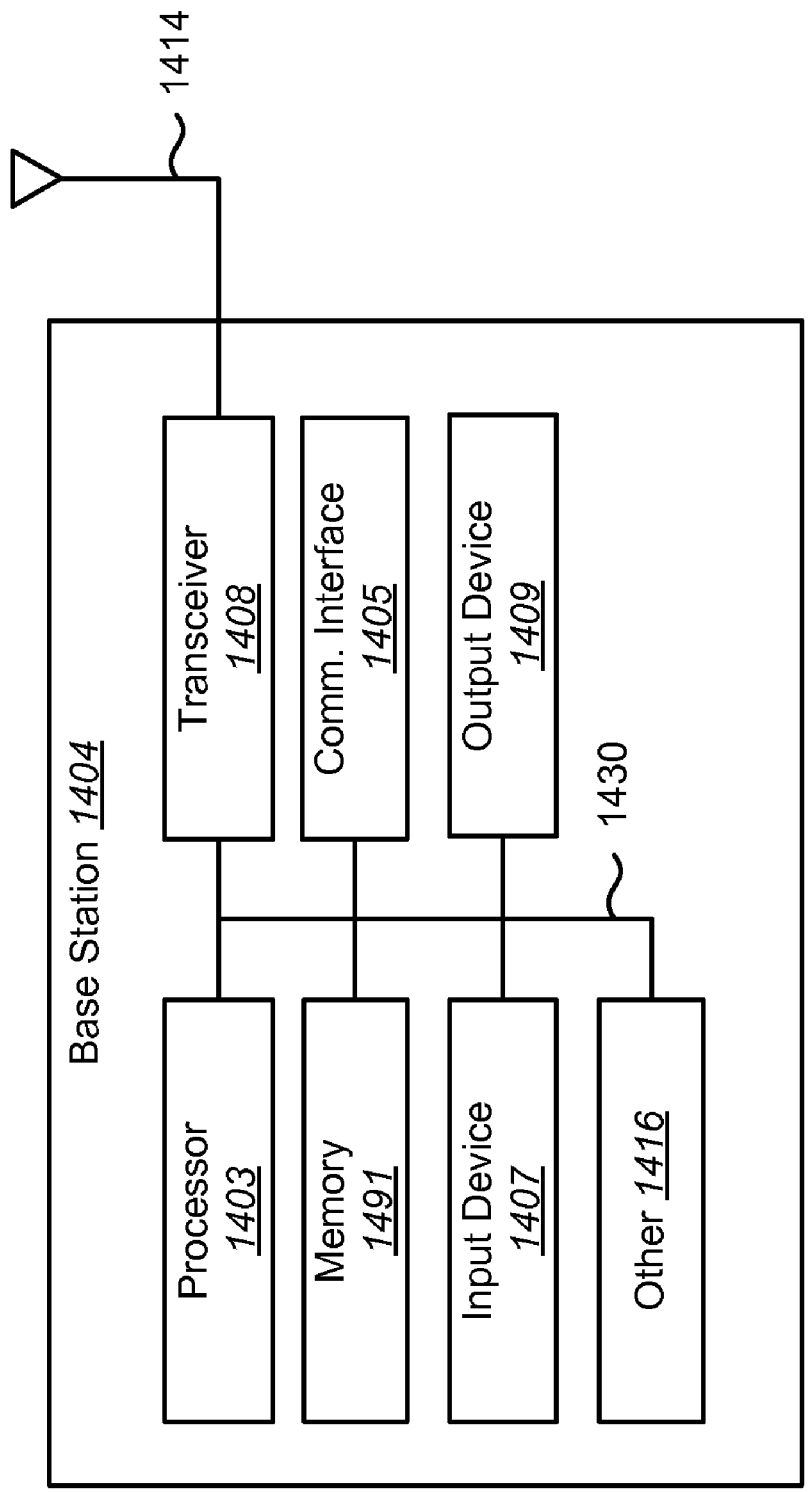
FIG. 14 is a general block diagram of hardware components that may be used with embodiments of a base station.

FIG. 14 is a general block diagram of hardware components that may be used with embodiments of a base station 1404. The base station 1404 includes a processor 1403, which controls operation of the base station 1404. The processor 1403 may also be referred to as a CPU. The processor 1403 controls the operation of the system and may be embodied as a microprocessor, a microcontroller, a digital signal processor (DSP) or other device known in the art. The processor 1403 typically performs logical and arithmetic operations based on program instructions stored within the memory 1404.

Memory 1491, which may include both read-only memory (ROM) and random access memory (RAM), provides instructions and data to the processor 1403. A portion of the memory 1491 may also include non-volatile random access memory (NVRAM). As used herein, the term "memory" 1491 is broadly defined as any electronic component capable of storing electronic information, and may be embodied as read only memory (ROM), random access memory (RAM), magnetic disk storage media, optical storage media, flash memory devices in RAM, on-board memory included with the processor 1403, EPROM memory, EEPROM memory, registers, etc. The memory 1491 typically stores program instructions and other types of data. The program instructions may be executed by the processor 1403 to implement some or all of the methods disclosed herein.

A transceiver 1408 is included to receive the wireless signals, which may include site monitoring data 123 from a site monitoring system 121 or security device 751, from the devices 402 and transmit any configuration data 125 to the device 402 for further transmission to the site monitoring system 121 or security device 751. An antenna 1414 is in electronic communication with the transceiver 1408. Additional antennas and receivers (not shown) may also be used. Other than the details included herein, and references herein, the operation of the transceiver 1408 and antenna 1414 is well known in the art and need not be described herein.

The system may also include one or more communication interfaces 1405 for communicating with other electronic devices and computing devices. For example, a communication interface 1405 is used to communicate with the location and telemetry system 406 via a network 408. The communication interfaces 1405 may be based on wired communication technology, wireless communication technology, or both. Examples of different types of communication interfaces 1405 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a ZigBee wireless communication adapter, WLAN, an ultra wideband wireless communication adapter, and so forth.

The system typically also includes one or more input devices 1407 and one or more output devices 1409. Examples of various input devices 1407 and output devices 1409 were described above.

Of course, FIG. 14 illustrates only one possible configuration of hardware components that may be used. Other devices 1416 may also be included. Various other architectures and components may be utilized. In addition, various standard components are not illustrated in order to avoid obscuring aspects of the invention.

The various components of the system 1404 may be coupled together by a bus system 1430, which may include a power bus, a control signal bus, and a status signal bus in addition to a data bus. However, for the sake of clarity, the various busses are illustrated in FIG. 14 as the bus system 1430. The system 1404 illustrated in FIG. 10 is a functional block diagram rather than a listing of specific components.

In one embodiment the base station is implemented through the use of a personal computer in electronic communications with the receiver and high-performance cards that are configured to decode and demodulate the received wireless signals from the devices.

Figure 15:
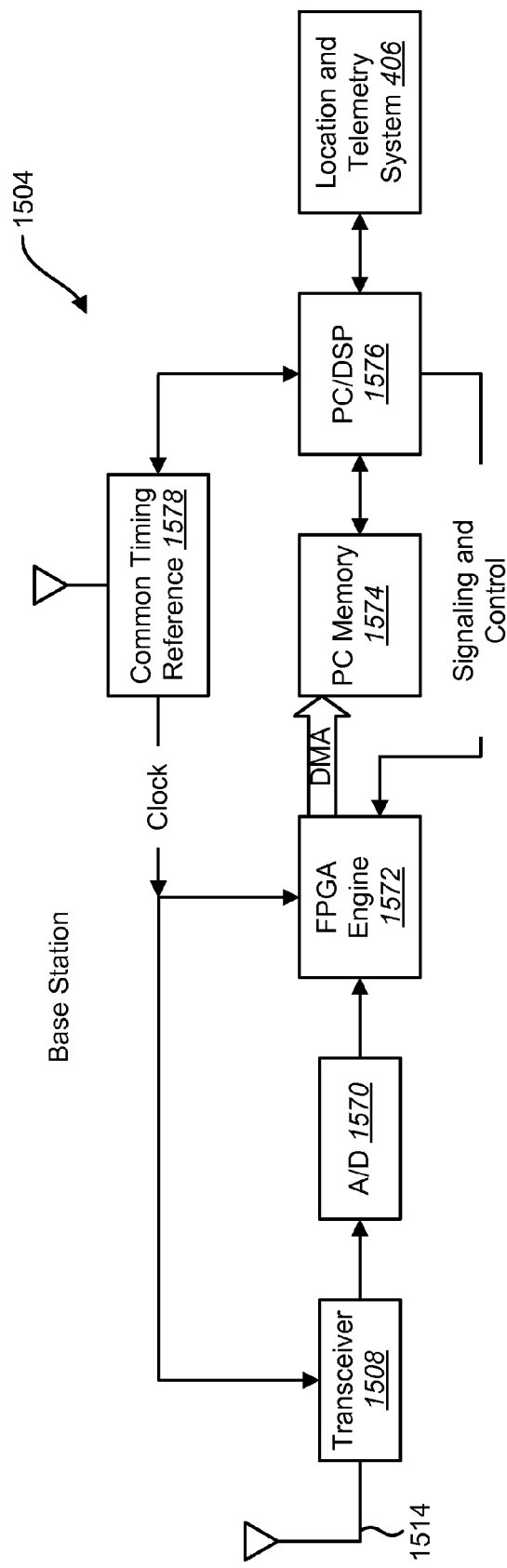
FIG. 15 is a functional block diagram of an embodiment of a base station.
Figure 16:
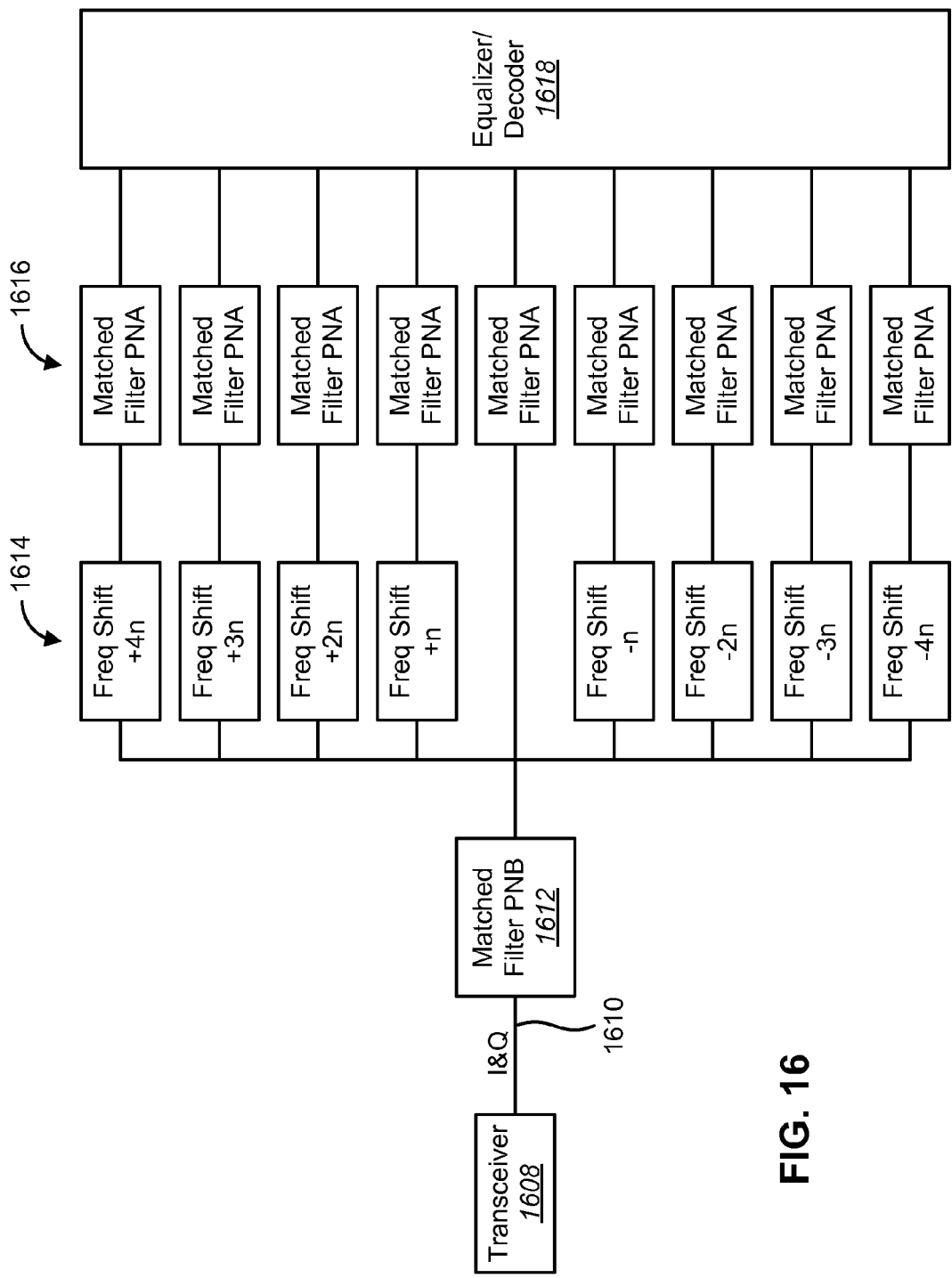
FIG. 16 is a functional block diagram of the demodulating and decoding that takes place at the base station.

FIG. 15 is a functional block diagram of an embodiment of a base station 1504. The base station 1504 includes a transceiver 1508 and antenna 1514 that receive the wireless signals, such as site monitoring data 123, from the devices 402 and transmitting data such as configuration data 125 to the devices 402. The base station 1504 includes analog to digital converter functions (A/D) 1570 to convert the received wireless signal from analog to digital. A hardware acceleration engine 1572 is used to despread and decode the data. A more particular block diagram of the despreading and decoding is shown in FIG. 16. The despread and decoded data is then stored in some type of memory 1574. A computer 1576 may be used to control the base station 1504 and send data to and from the location and telemetry system 406. The computer 1576 may be in electronic communication with the location and telemetry system 406 through an IP network 408.

The present systems and methods may utilize multiple base stations 1504 synchronized to a common timing reference. The base stations 1504 may be time synchronized to each other (typically within billionths of a second) to deliver accurate positioning data. This base station 1504 synchronization can be accomplished using a number of techniques including but not limited to GPS time transfer, synchronization to a central radio beacon such as public broadcast or custom beacon, or synchronization to a timing reference transmitted over wire or optical cable. If the GPS time transfer method is used, a GPS receiver 1578 is included at the base station 1504. The base stations 404 may be connected to a location and telemetry system 406 via a network 408. The location and telemetry system 406, utilizing Time Difference Of Arrival (TDOA) techniques, TDOA techniques combined with signal strength measurement techniques, or TDOA techniques combined with any other method of location determination (for example, location determined by what receiver is hearing the signal or by GPS), may determine the locations of the devices 402.

The received DSSS pseudonoise (PN) burst signal may be despread and demodulated to determine device identification and extract the transmitted data. Each base station 1504 may also determine and record the time of arrival of the radio burst relative to the synchronized timing reference. The time-of-arrival, or time stamp, information and demodulated data may then be forwarded to the location and telemetry system 406.

FIG. 16 is a functional block diagram of the DSSS despreading that takes place at the base station 404. The transceiver 1608 receives the wireless signal. The I&Q data channels 1610 are first processed by a matched filter 1612 with the PNB codes 1022b as coefficients. It is desirable to have a low cost device that includes low cost components. A crystal is an example of a low cost radio frequency reference. Because the crystal oscillator has limited frequency accuracy, the received signal at the base station can be in error and cause correlation loss in the matched filter 1612. In one of the embodiments, the correlation loss is limited by design to 4.5 dB or less, for example. FIG. 16 functionally shows the reduced complexity matched filter architecture to limit correlation loss due to frequency error. Since frequency error results in phase roll across the PN sequence causing correlation loss, a bank of frequency shifters 1614 is incorporated prior to running the data through the second PNA matched filters 1616. The number of frequency shifters 1614 and PNA matched filters 1616 is determined by the desired worst case phase roll across the concatenated PN codes. The frequency shifters 1614, in the present embodiment, are offset by the frequency n. For example, the frequency shifters 1614 may be offset by fixed-interval hertz. In other embodiments, the frequency shifters 1614 may be offset by any frequency, may use arbitrary frequencies, or may use a combination of the two. The frequency shift blocks perform a complex frequency shift.

The equalizer/decoder 1618 uses all the outputs of the matched filter bank structure to determine the frequency shift of the incoming signal and select a set of advantageous signals. The signal selection criteria seeks to maximize demodulation performance by selecting signals with the best signal to noise ratio (SNR) and other demodulation metrics. However, the concatenated codes method of implementing DSSS spreading introduces well defined partial correlation signals that repeat every PNB chips and appear as replicated signals or ghosts of the primary correlation signals. Since these ghosts are well defined in time they are identified and filtered out by the decoder system 1618.

Figure 17:
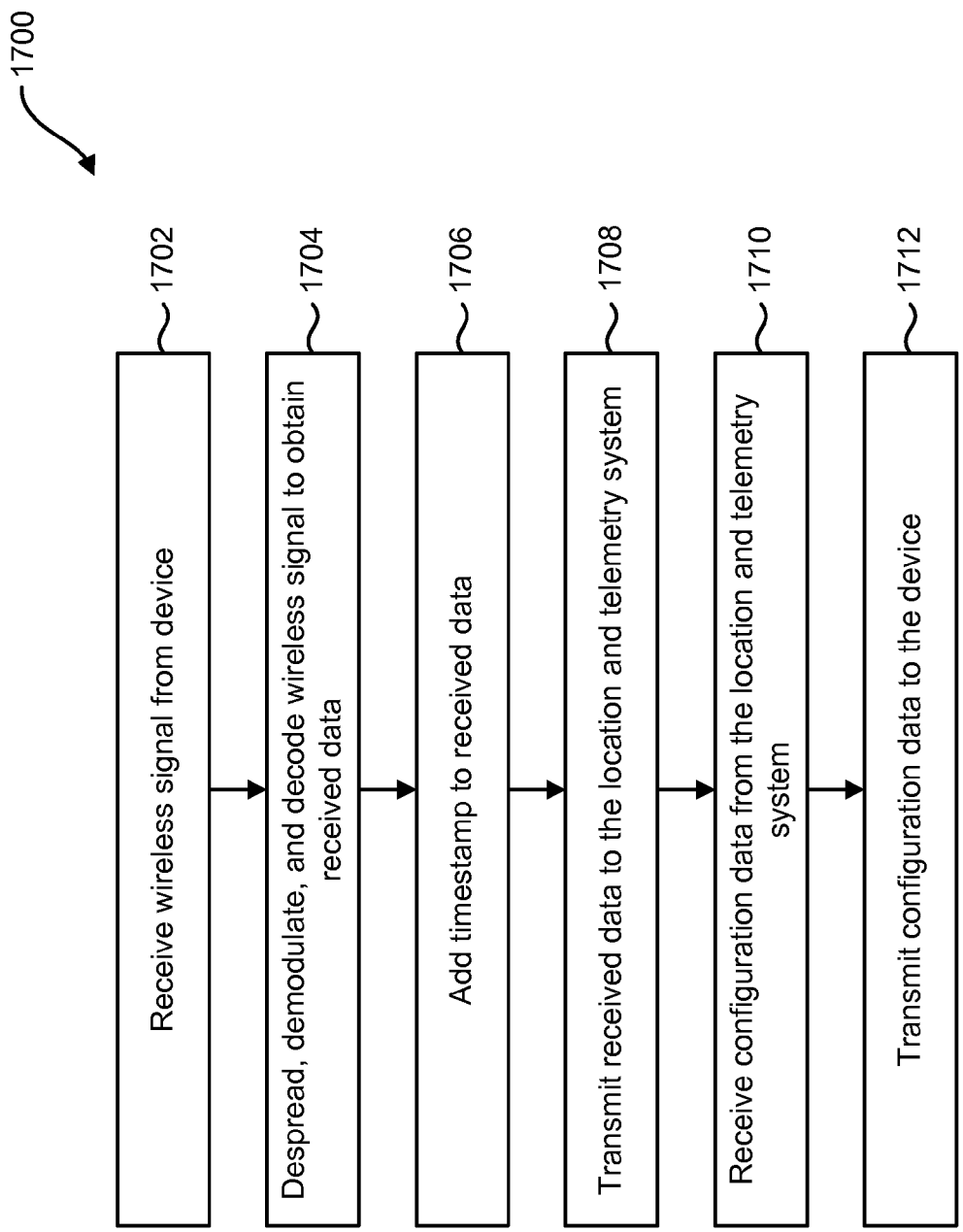
FIG. 17 is a flow diagram of an embodiment of a method of operation for a base station.

FIG. 17 is a flow diagram of an embodiment of a method 1700 of operation for a base station 404. The wireless signals from the devices 402 are received 1702, despread, demodulated and decoded 1704. Then a timestamp may be added 1706 to the data received. Then the received data is transmitted 1708 to the location and telemetry system 406 where the data is processed. The received data may also be used by the location and telemetry system 406 to determine the location of each device 402.

The base station 404 may receive 1710 configuration data 125 from the location and telemetry system 406. The received 1710 configuration data 126 may be transmitted 1712 to a device 402.

Figure 18:
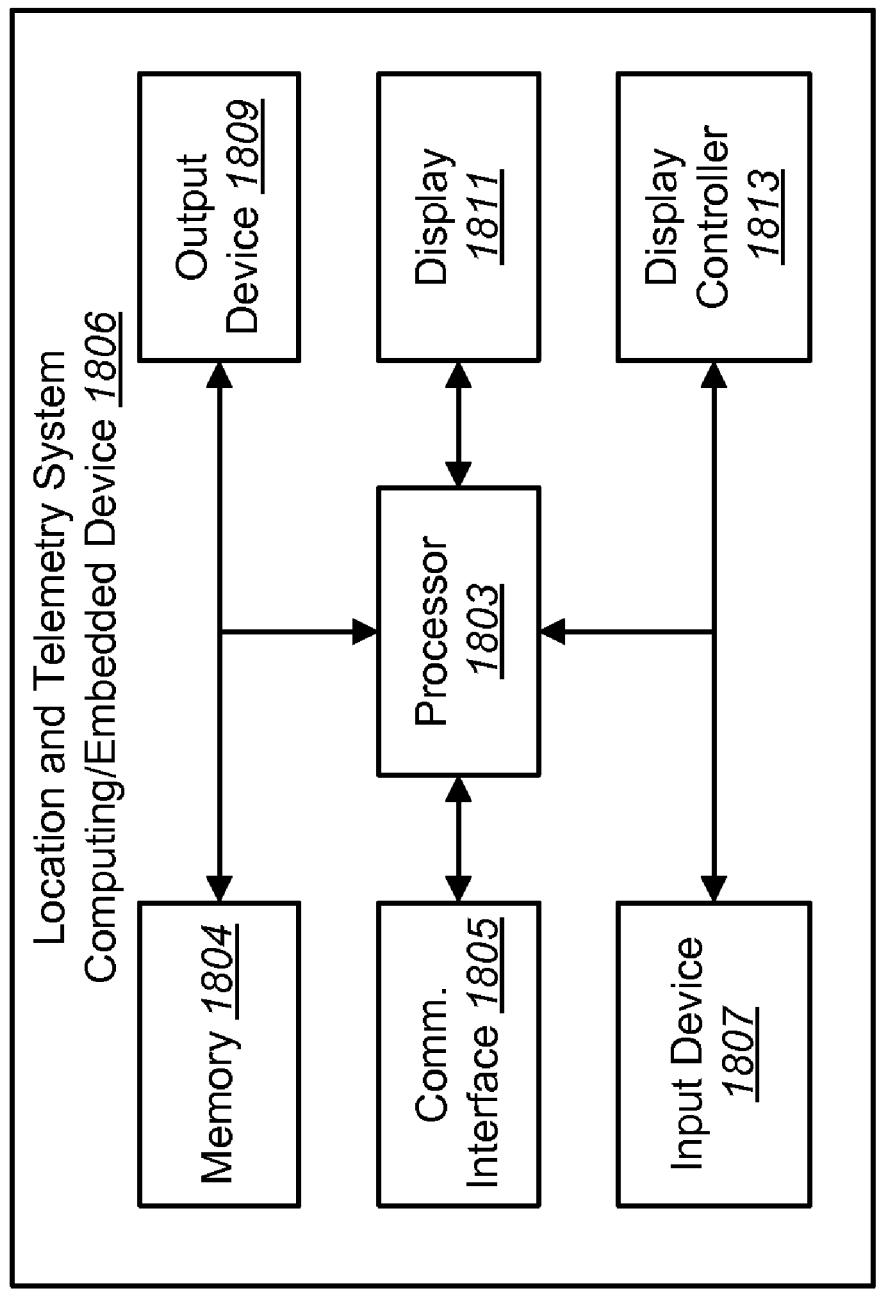
FIG. 18 is a block diagram illustrating the major hardware components typically utilized in a location and telemetry system.

FIG. 18 is a block diagram illustrating the major hardware components typically utilized in a location and telemetry system 1806. The location and telemetry system 1806 is typically implemented in a computing device 1806. The illustrated components may be located within the same physical structure or in separate housings or structures.

The computing device 1806 includes a processor 1803 and memory 1804, which have been discussed above. The computing device 1806 typically also includes one or more communication interfaces 1805 for communicating with other electronic devices (e.g., the base stations 404 and the network operations center 410). Examples of communication interfaces 1805 have been discussed above.

The computing device 1806 typically also includes one or more input devices 1807 and one or more output devices 1809. Examples of different kinds of input devices 1807 and output devices 1809 have been discussed above. The location and telemetry system 1806 may also include a display 1811 and a display controller 1813.

Of course, FIG. 18 illustrates only one possible configuration of a computing device 1806. Various other architectures and components may be utilized. In addition, various standard components are not illustrated in order to avoid obscuring aspects of the invention.

Figure 19:
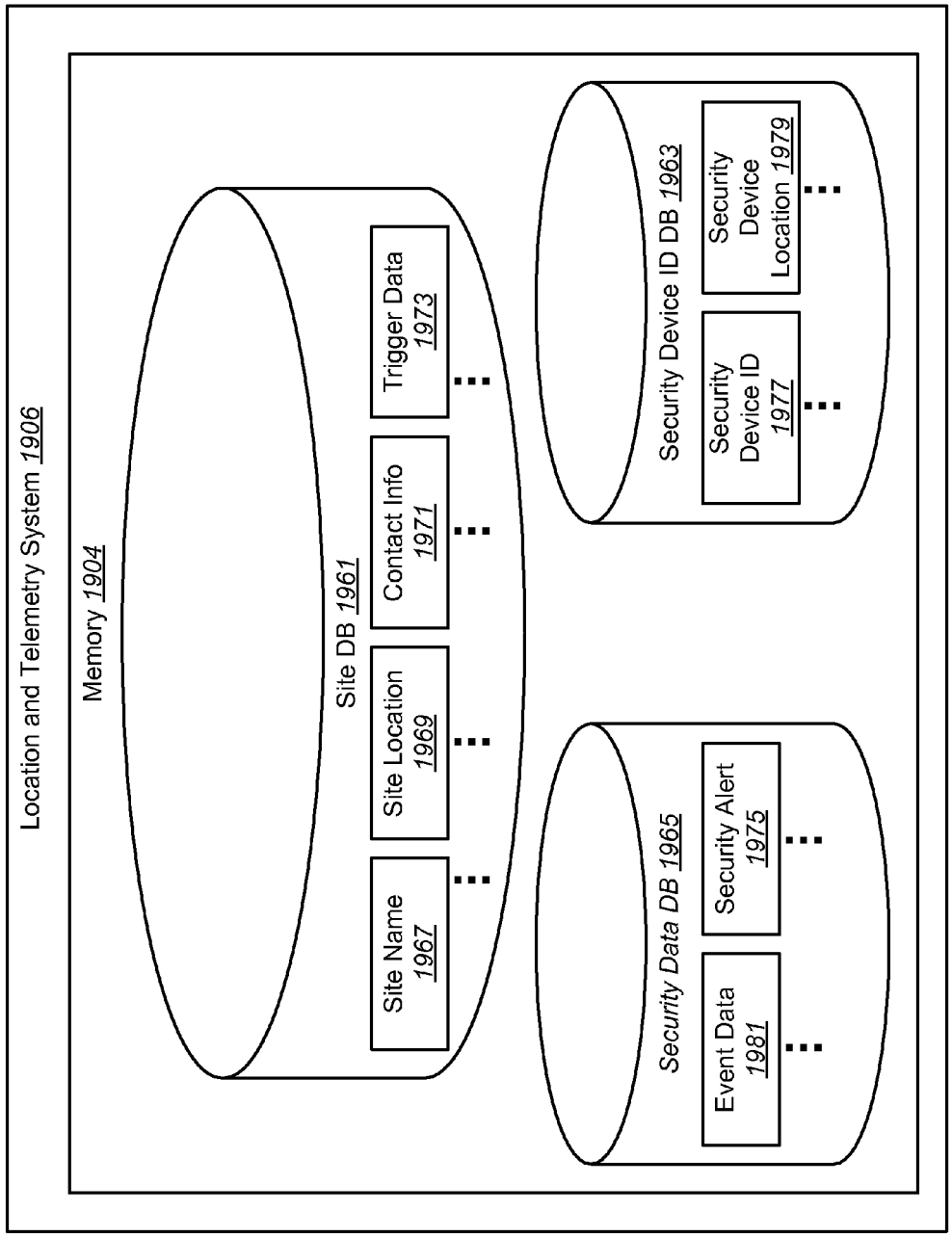
FIG. 19 is a block diagram of an embodiment of memory in a location and telemetry system.

FIG. 19 is a block diagram of an embodiment of memory 1904 in a location and telemetry system 1906. The memory 1904 may include a site database 1961, a security device identification (security device ID) database 1963, and a security data database 1965.

The site database 1961 may include site information such as the site names 1967, site locations 1969, contact information 1971, and trigger data 1973. The site names 1967 may include the name of the site that is being monitored and may also include a site identification associated with the site name 1967. The site location 1969 may indicate the physical location of the site that is being monitored. The contact information 1971 may include the name and telephone number, email address, pager number, or other means of contacting the desired contact. For example, the nursing home shown in FIG. 5 may have the site name 1967 "Nursing Home 1," the site location 1969 "1234 SomeStreet, SomeCity, SomeState, SomeZip," and the contact information 1971 "John Smith, 555-555-5555."

The trigger data 1973 may include any events or signals stored in the site monitoring data 123 that are received by the location and telemetry system 406. For example, a client 414 may opt to only receive a security alert 1975 when a security device 751, such as a motion detector 545, sends multiple signals that indicate a breach of security. A motion detector 545 may receive more than one alert if the sensor in the motion detector 545 senses movement more than once. A client 414 may opt only to receive a security alert 1975 when a security device 751 has detected an event that continues for a predetermined duration. Other examples of trigger data 1973 may include a specified duration of the event, that the event occurred within a certain time-period, and so forth.

The security device ID database 1963 may include security device IDs 1977 and the security device location 1979. The security device IDs 1977 may be used to determine which security device 751 is associated with the event. For example, if the event was movement sensed by a motion detector 545, the security device ID 1977 may indicate which motion detector 545 sensed this event. Typically each security device includes a security device ID 1977 that is transmitted to the Burst DSSS Radio System 101 with any alert or data that the security device transmits to the Burst DSSS Radio System 101. The security device location 1979 may be associated with the security device ID 1977. For example, the site monitoring data 123 may only include the security device ID 1977 and the location and telemetry system 406 may lookup the security device location 1979 in the security device ID database 1963 based on the security device ID 1977.

The security data database 1965 may include event data 1981 and security alerts 1975. The event data 1981 may include the information sent from the security devices 751. For example, the event data 1981 may include information regarding the time of the event, type of event, duration of the event, image data from a security camera 547, the security device ID 1977 related to the event, etc. In some embodiments, the security device identification may be stored both in the security device ID database 1963 with the security device ID 1977 and the security data database 1965 with the event data 1981.

A security alert 1975 may include information that may be sent to a client 414 or service provider 412. In some embodiments, the security alert 1975 may include information processed by the location and telemetry system 406, as will be discussed in connection with FIG. 21. In one embodiment, the security alert 1975 may include the text of an email that may be sent to the client 414 based on the contact information 1971 stored in the site database 1961. In another embodiment, the security alert 1975 may include details of the event that may be reported to the client 414 by a recorded message or a customer service technician based on the contact information 1971. Further embodiments, may include the text of an alert email, the event details for a recorded message, and/or other types of information that may be used to inform the client of the details of the reported event. The security alert 1975 may not be sent to the client in cases where the event does not match the criterion specified by the trigger data 1973 stored in the site database 1961. For example, if the trigger data 1973 indicates that the client 414 has opted only to be alerted if the event is of a particular duration and the event was of shorter duration than that specified in the trigger data 1973, the security alert 1975 may simply be stored in the security data database 1965. A security alert 1975 may also be remotely accessed by a client 414, along with other stored data, at a later time, regardless of whether the security alert 1975 has been reported to the client 414.

Figure 20:
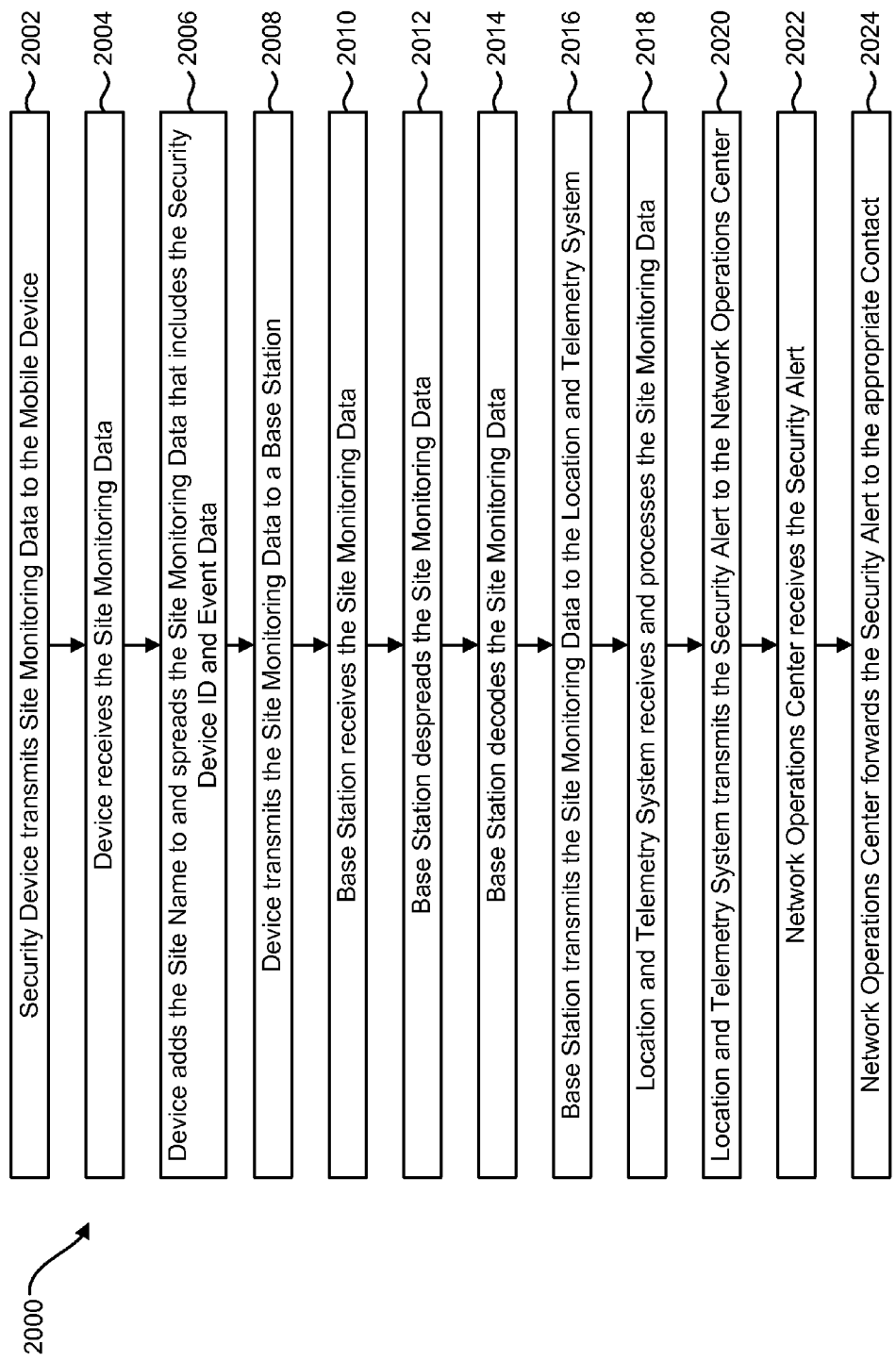
FIG. 20 is an embodiment of a method of operation for a system for site monitoring through the use of burst DSSS radio signals.

FIG. 20 is an embodiment of a method 2000 of operation for a system for site monitoring through the use of burst DSSS radio signals. In accordance with the method 2000, a security device 751 may transmit 2002 site monitoring data 123 to a device 402. The site monitoring data 123 may be transmitted 2002 by a security device 751 or the site monitoring system 121 wirelessly or using a hardwired connection, as disclosed above. The site monitoring data 123 transmitted 2002 by the security device 751 may include the security device ID 1977 and event data 1981. The device 402 may receive 2004 the site monitoring data 123. In some embodiments, the site monitoring data 123 may be received 2004 via the antenna 814 and transceiver 808 on the device 402. In other embodiments, the site monitoring data 123 may be received 2004 directly through a wired connection through the transceiver 808 or other communication interface. In further embodiments, the device 402 may receive 2004 the data both wirelessly and through a wired connection.

In one embodiment, the device 402 adds 2006 the site name 1967 to and spreads the site monitoring data 123, which may include the security device ID 1977 and event data 1981. In other embodiments, the site name 1967 may be added to the site monitoring data 123 by the security device 751 or another element in the Burst DSSS Radio System 101. The method 1300 for spreading of the data is shown in FIG. 13.

The device 402 may transmit 2008 the site monitoring data 123 to a base station 404. A base station 404 may receive 2010 the site monitoring data 123 from the device 402. In some embodiments, more than one base station 404 may receive 2010 the site monitoring data 123 depending on whether the device 402 is within the range of the base station 404. The site monitoring data 123 received 2010 by the base station 404 may include the security device ID 1977, the device ID 920, the event data 1981, and the site name 1967.

The base station 404 may despread 2012 the site monitoring data 123 and then decode 2014 the site monitoring data 123. The base station 404 may also transmit 2016 the site monitoring data 123 to the location and telemetry system 406. The despreading 2012, decoding 2014, and transmission 2016 of data by a base station 404 is discussed in connection with FIG. 17 above. The site monitoring data 123 transmitted 2016 to the location and telemetry system 406 may include the security device ID 1977, the device ID 920, the event data 1981, the site name 1967, a timestamp, or other data originally sent by the security device 751 or added by the device 402 or base station 404.

The location and telemetry system 406 may receive and process 2018 the site monitoring data 123. The location and telemetry system 406 may transmit 2020 the security alert 1975 to the network operations center 410. The method of operation for a location and telemetry system 406 is discussed in connection with FIG. 21 below. The location and telemetry system 460 may transmit 2020 additional data to the network operations center 410 including the site monitoring data 123 originally transmitted 2002 by the security device 751, transmitted 2008 by the device 402, and/or transmitted 2016 by the base station 404.

The network operations center 410 may receive 2022 the site monitoring data 123. The network operations center 410 may forward 2024 the site monitoring data 123 to the appropriate contact based on the contact information 1971 as specified in the security alert 1975. As discussed above, forwarding 2024 the security alert 1975 to the client 414 may include a telephone recording, email contact, or other method of contacting the client 414. In some embodiments, the client 414 may receive a forwarded 2024 security alert 1975 and/or may remotely access the security alert 1975 or other data through the network operations system 410 or location and telemetry system 406.

Figure 21:
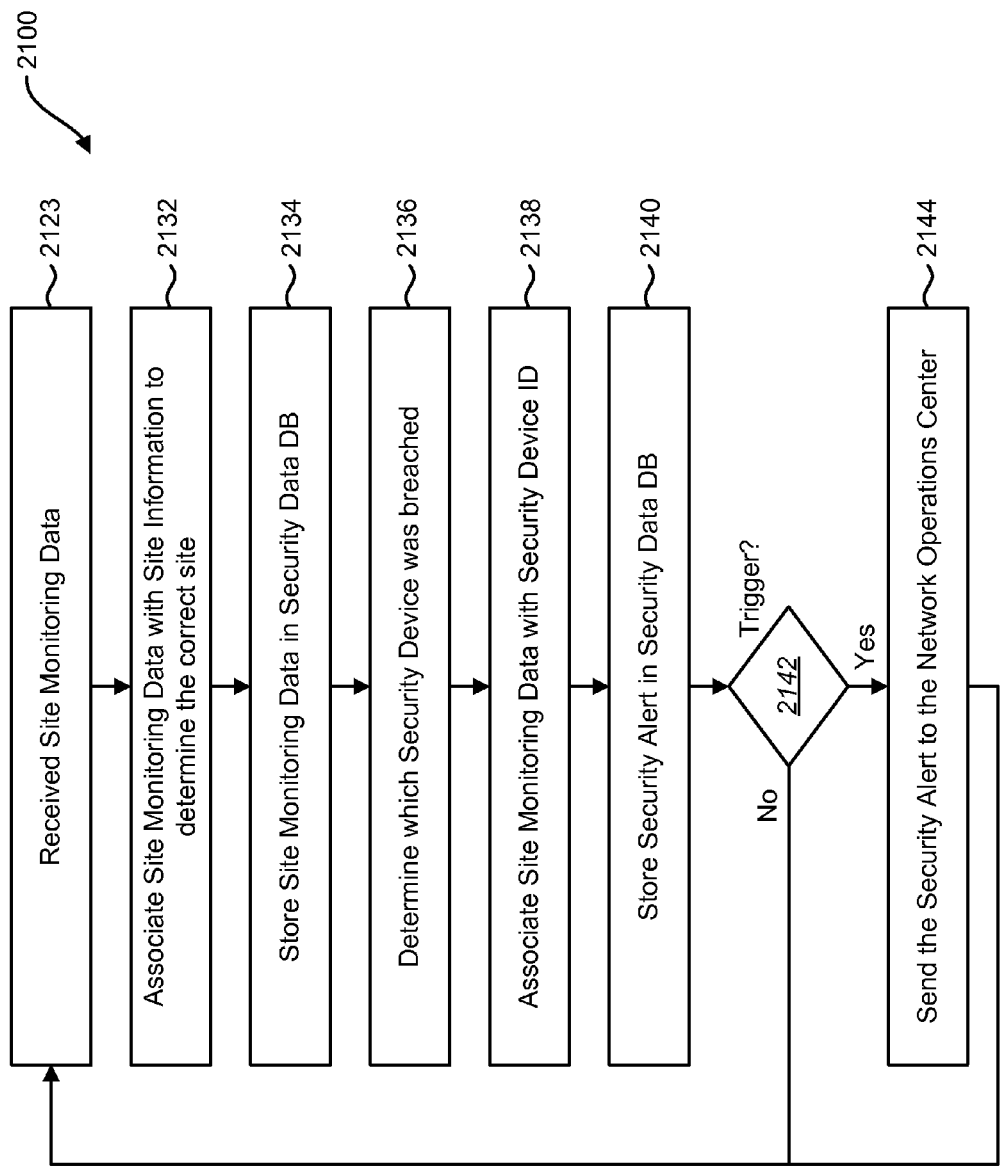
FIG. 21 is an embodiment of a method of operation of a location and telemetry system.

FIG. 21 is an embodiment of a method 2100 of operation of a location and telemetry system 406. The site monitoring data is received 2123 and associated 2132 with the site information in the site database 1961 to determine the site 531 from which the site monitoring data 2123 originated. For example, the security device 751, device 402, or base station 404 may have included the site name 1967 with the received site monitoring data 2123. In other embodiments, the security device ID 1977 may be associated with the site database 1961, such that the site location 1969 may be determined based on the security device ID 1977.

The location and telemetry system 406 may store 2134 the site monitoring data 2123 in the security data database 1965. Storing 2134 the site monitoring data 2123 may include storing the event data 1981 and/or storing the security alerts 1975 in the security data database 1965.

The location and telemetry system 460 may determine 2136 which security device 751 sent the site monitoring data 2123. This determination 2136 may be made by looking up the security device ID 1977 included in the site monitoring data 2123 in the security device ID database 1963.

The location and telemetry system 406 may associate 2138 the security device ID 1977 with its associated information in the site database 1961 that is related to the security device ID 1977, such as the site name 1967, site location 1969, contact information 1971 for the security device 751 or site 531, and/or trigger data 1973 associated with the security device 751 or site 531. In other embodiments, the security device ID 1977 may also be associated with the security device location 1979 related to the security device ID 1977.

The location and telemetry system 406 may store 2140 a security alert 1975 in the security data database 1965. Storing 2140 a security alert 1975 may include preparing the text of an email to be sent to the contact specified in the contact information field 1971. In other embodiments, the email may be automatically sent by the location and telemetry system 406. Storing 2140 a security alert 1975 may also include the details of the event that may be reported to the client 414 by a recorded message or a customer service technician based on the contact information 1971. In further embodiments, storing 2140 a security alert 1975 may include preparing the text of an alert email, the event details for a recorded message, and/or other types of information that may be used to inform the client of the details of the reported event.

The location and telemetry system 406 may determine 2142 whether the event data 1981 satisfies the requirements of the trigger data 1973 associated with the site 531 or security device 751. For example, the trigger data 1973 associated with the event may indicate that the client 414 is to be notified of any events that occur in a particular room or perimeter 632. If the event originated from a security device 751 located in the particular room or perimeter, of this example, the location and telemetry system 406 may determine that the trigger data 1973 has been satisfied. If the event data 1981 satisfies the requirements of the trigger data 1973 associated with the site 531 or security device 751, the location and telemetry system 406 may send 2144 the security alert 1975 to the network operations center 410 and continue receiving the site monitoring data 2123 from the base stations 404. If the event data 1981 does not satisfy the requirements of the trigger data 1973, the location and telemetry system 406 may not send a security alert 1975 to the network operations center 410 and may continue receiving site monitoring data 2123 from the base stations 404.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for site monitoring, the device comprising:
    a communication interface configured to receive site monitoring data from a site monitoring system and configured to wirelessly transmit the site monitoring data to at least one base station, wherein the site monitoring data includes a device identification;
    a processor in electronic communication with the communication interface;
    memory in electronic communication with the processor, wherein the memory includes:
        a device identification that identifies the device;
        a first PN code;
        a second PN code; and
    instructions stored in the memory, the instructions being executable to:
        receive the site monitoring data from the site monitoring system;
        spread the site monitoring data using the first PN code to provide first spread site monitoring data;
        spread the first spread site monitoring data using the second PN code to provide second spread site monitoring data; and
        transmit the second spread site monitoring data using a burst direct sequence spread spectrum radio signal.

2. The device of claim 1, wherein the site monitoring data received by the communication interface from a site monitoring system was transmitted by a security device.

3. The device of claim 2, wherein the site monitoring data includes data received from an access control device.

4. The device of claim 2, wherein the site monitoring data includes data received from a security camera.

5. The device of claim 2, wherein the site monitoring data received from a site is received from a motion detector.

6. The device of claim 1, wherein the site monitoring data received by the communication interface from the site monitoring system includes wireless signals.

7. The device of claim 6, wherein the wireless signals are received by the communication interface from the site monitoring system using ultra wideband radio signals.

8. The device of claim 1, wherein the site monitoring data received by the communication interface from the site monitoring system are received over a network using mesh networking.

9. The device of claim 1, wherein the site monitoring data transmitted by the communication interface to the at least one base station includes wireless signals.

10. The device of claim 1, wherein the communication interface is configured to communicate with an antenna for receiving signals from the at least one base station.

11. The device of claim 10, wherein the signals received from the at least one base station include configuration data.

12. The device of claim 1, wherein the communication interface is configured to communicate with an antenna for transmitting signals to a site monitoring system.

13. The device of claim 12, wherein the device for site monitoring is a mobile device.

14. A system for site monitoring comprising:
   a site monitoring system including at least one security device, wherein the site monitoring system is configured to transmit site monitoring data including at least one security device identification;
   at least one device, wherein each device is configured to transmit its device identification and site monitoring data, wherein each device performs two spreading operations on the site monitoring data with two distinct PN codes, a first PN code and a second PN code, wherein each device transmits the spread site monitoring data using a burst direct sequence spread spectrum radio signal; and
   at least one base station, wherein the at least one base station is configured to receive the burst direct sequence spread spectrum radio signal that includes site monitoring data, wherein each base station decodes the signal by first de-spreading with the second PN code, second applying any needed frequency correction, and third de-spreading with the first PN code.

15. The system for site monitoring as in claim 14, wherein each base station is further configured to provide the despread, demodulated and decoded site monitoring data with other information to a system for processing the despread, demodulated and decoded data.

16. The system for site monitoring as in claim 15 further comprising
   a system for processing the despread, demodulated and decoded site monitoring data, and wherein the system for processing the despread, demodulated and decoded site monitoring data is further configured to store the site monitoring data and to further provide an interface for other systems to access the site monitoring data.

17. The system for site monitoring as in claim 16 wherein processing the despread, demodulated and decoded data includes associating the site monitoring data with a site identification.

18. The system for site monitoring as in claim 17 wherein processing the despread, demodulated and decoded site monitoring data includes sending a security alert to a client via a network operations center and wherein the security alert includes at least one of the following: an email message to be forwarded to a client, a voice message to be forwarded to a client, or an email message to be forwarded to a service provider.

19. The system for site monitoring as in claim 18 wherein the one of the at least one devices is a mobile device.

20. A system for site monitoring comprising:
   at least one security device configured to transmit site monitoring data including at least one security device identification, wherein the security device performs two spreading operations on the site monitoring data with two distinct PN codes, a first PN code and a second PN code, wherein the security device transmits the spread site monitoring data using a burst direct sequence spread spectrum radio signal; and
   at least one base station, wherein the at least one base station is configured to receive the burst direct sequence spread spectrum radio signal that includes site monitoring data, wherein each base station decodes the signal by first de-spreading with the second PN code, second applying any needed frequency correction, and third de-spreading with the first PN code.

* * * * *

UNITED STATES PATENT AND TRADEMARK OFFICE
CERTIFICATE OF CORRECTION

| | | |
|---|---|---|
| PATENT NO. | : 7,796,675 B1 | Page 1 of 1 |
| APPLICATION NO. | : 12/046950 | |
| DATED | : September 14, 2010 | |
| INVENTOR(S) | : David Carter et al. | |

It is certified that error appears in the above-identified patent and that said Letters Patent is hereby corrected as shown below:

In column 5, line 8 please delete "replacement Likewise" and replace it with --replacement. Likewise--.

Signed and Sealed this
Eleventh Day of January, 2011

David J. Kappos
*Director of the United States Patent and Trademark Office*